(12) United States Patent
McKenzie et al.

(10) Patent No.: US 7,092,193 B1
(45) Date of Patent: Aug. 15, 2006

(54) DYNAMICALLY ADJUSTABLE HEAD DISK SPACING SLIDER USING THERMAL EXPANSION

(75) Inventors: Robert McKenzie, Longmont, CO (US); Thao Nguyen, San Jose, CA (US); Xiaokun Chew, San Jose, CA (US); Gang Herbert Lin, San Jose, CA (US); Jack Tsai, Milpitas, CA (US); Bruce Schardt, Tracy, CA (US); Steven Marshall, Northboro, MA (US)

(73) Assignee: Maxtor Corporation, Longmont, CO (US)

( * ) Notice: Subject to any disclaimer, the term of this patent is extended or adjusted under 35 U.S.C. 154(b) by 378 days.

(21) Appl. No.: 10/211,671

(22) Filed: Aug. 2, 2002

Related U.S. Application Data

(63) Continuation-in-part of application No. 10/076,212, filed on Feb. 12, 2002, now abandoned.

(60) Provisional application No. 60/269,774, filed on Feb. 16, 2001.

(51) Int. Cl.
*G11B 21/02* (2006.01)

(52) U.S. Cl. ...................................... 360/75
(58) Field of Classification Search ................. 360/75, 360/78.07
See application file for complete search history.

(56) References Cited

U.S. PATENT DOCUMENTS

| | | | | |
|---|---|---|---|---|
| 5,421,943 A | * | 6/1995 | Tam et al. ................ | 156/273.9 |
| 5,862,015 A | * | 1/1999 | Evans et al. .............. | 360/244.1 |
| 5,880,626 A | * | 3/1999 | Dean .......................... | 327/552 |
| 5,880,899 A | | 3/1999 | Blachek et al. | |
| 5,959,801 A | * | 9/1999 | Gillis et al. ................ | 360/75 |
| 5,965,840 A | | 10/1999 | Nagarajan et al. | |
| 5,991,113 A | * | 11/1999 | Meyer et al. ............... | 360/75 |
| 6,011,239 A | | 1/2000 | Singh et al. | |
| 6,195,219 B1 | | 2/2001 | Smith | |
| 6,452,740 B1 | | 9/2002 | Ghoshal | |
| 6,538,836 B1 | * | 3/2003 | Dunfield et al. .......... | 360/75 |
| 6,735,036 B1 | * | 5/2004 | Olim .......................... | 360/75 |
| 2001/0030822 A1 | * | 10/2001 | Boutaghou et al. ...... | 360/25 |
| 2002/0067565 A1 | * | 6/2002 | Kelemen .................... | 360/75 |
| 2002/0097528 A1 | * | 7/2002 | Williams et al. .......... | 360/294.3 |
| 2003/0174430 A1 | | 9/2003 | Takahashi et al. | |

OTHER PUBLICATIONS

B.K. Gupta et al., "Head Design Considerations for Lower Thermal PLE Tip Recession and Alumina Overcoat Protrusion," May 2000, Tribology International, vol. 33, pp. 309-314.

* cited by examiner

*Primary Examiner*—Hoa T. Nguyen
*Assistant Examiner*—Mitchell Slavitt
(74) *Attorney, Agent, or Firm*—James P. Broder; Steven G. Roeder

(57) ABSTRACT

A disk drive includes a slider assembly and a controller that directs current to the slider assembly to dynamically adjust the head-to-disk spacing. In one embodiment, the slider assembly includes a write element having a first end, a second end and an intermediate section, a conductor that is connected to the intermediate section. In this embodiment, the controller directs electrical current through the conductor to heat the write element without writing data to a storage disk. The electrical current can be directed through the conductor at any time prior to data transfer or during data transfer. Heating the write element causes a deformation of the slider assembly to decrease the head-to-disk spacing. In another embodiment, the slider assembly includes a separate slider deformer. Electrical current is selectively directed to the slider deformer to cause a deformation of the slider assembly to obtain a desired head-to-disk spacing. The slider deformer can include electrically conductive material or can be a piezoelectric element. Further, the slider deformer can be serpentine-shaped or substantially planar in shape.

82 Claims, 15 Drawing Sheets

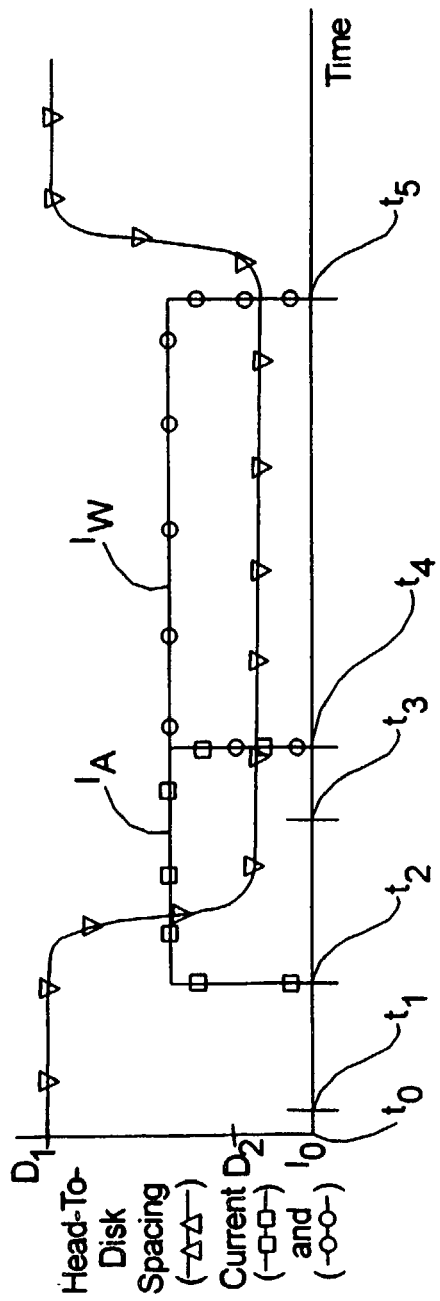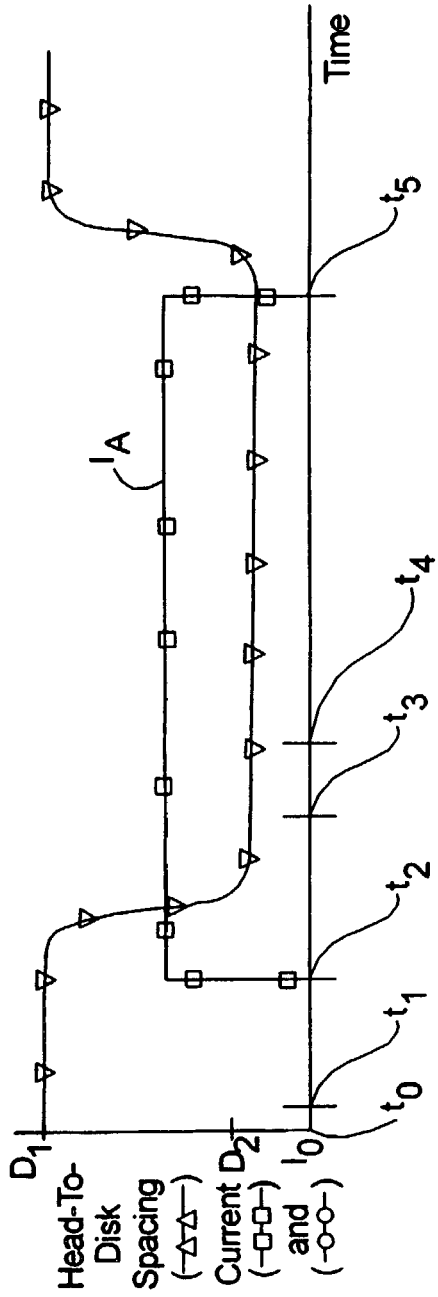

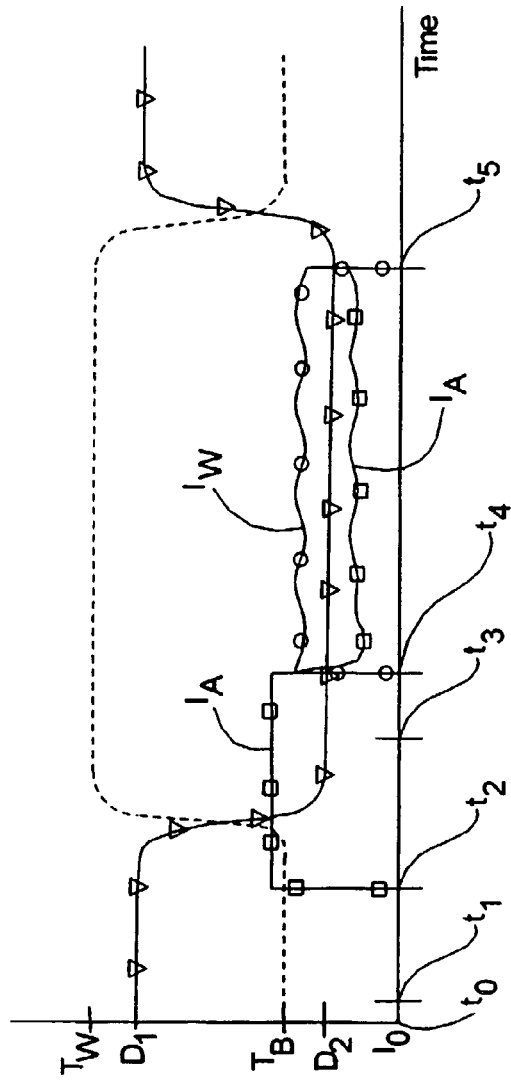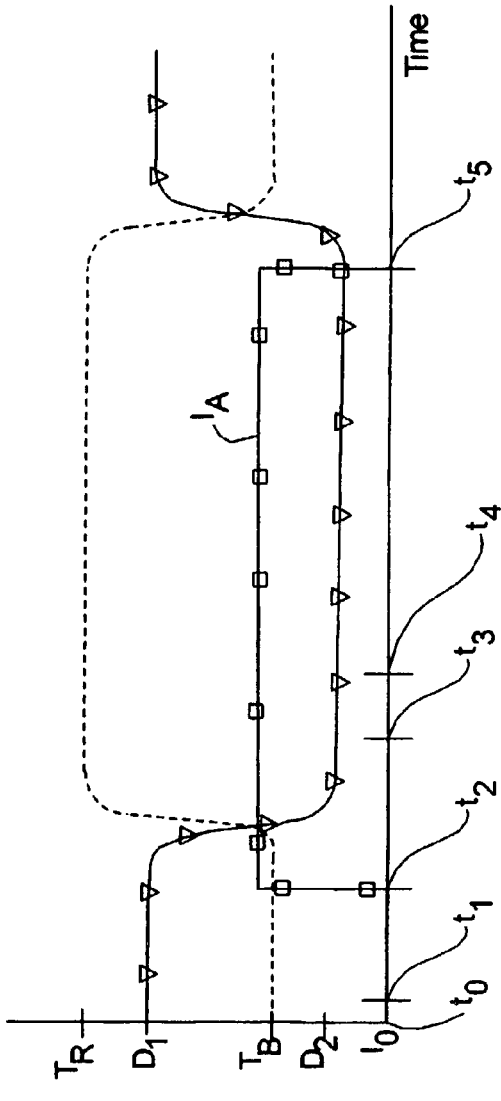

DYNAMICALLY ADJUSTABLE HEAD DISK SPACING SLIDER USING THERMAL EXPANSION

RELATED APPLICATION

This application is a continuation-in-part of U.S. patent application Ser. No. 10/076,212, filed on Feb. 12, 2002 now abandoned, which claims the benefit of U.S. Provisional Application Ser. No. 60/269,774, filed on Feb. 16, 2001. The contents of U.S. patent application Ser. No. 10/076,212 and U.S. Provisional Application Ser. No. 60/269,774 are incorporated herein by reference.

FIELD OF THE INVENTION

The present invention relates generally to disk drives for storing data. More specifically, the present invention relates to a dynamically adjustable slider assembly for a disk drive.

BACKGROUND

Disk drives are widely used in computers, consumer electronics and data processing systems for storing information in digital form. The disk drive typically includes one or more storage disks and one or more head suspension assemblies. Each head suspension assembly includes a slider assembly having an air bearing surface and a read/write head that transfers information to and from the storage disk. The rotation of the storage disk causes the slider assembly to ride on an air bearing a distance "h" from the storage disk. The distance "h" is referred to as the "fly height" of the slider assembly and represents the position that the slider assembly occupies when the storage disk is rotating during normal operation of the disk drive.

The term "head-to-disk spacing" refers to the distance between the read/write head and the storage disk. More specifically, the head-to-disk spacing for a disk drive is equal to the sum of (i) the carbon thickness on the read/write head, (ii) the distance between the read/write head and the carbon surface of the storage disk, (iii) the carbon thickness of the storage disk, and (iv) half of the thickness of the magnetic layer on the storage disk.

Each storage disk includes one or two disk surfaces that are divided into a plurality of narrow, annular regions of different radii, commonly referred to as data tracks. The number of tracks per radial inch (TPI) on the storage disk is known as track density. Digital information is recorded on the data tracks in the form of magnetic transitions or bits using the read/write head. The number of bits per inch (BPI) along the track is known as linear density. The areal density of the storage disk is determined by multiplying the tracks per inch by the linear density. Areal density is necessarily increasing in an effort to raise the storage capacity of the disk drive, while maintaining a fixed or lower manufacturing cost of the drive.

For a given linear density, a target head-to-disk spacing is required to ensure accurate data transfer. Unfortunately, consistent head-to-disk spacing during data transfer is difficult to achieve. For example, during the process of forming the air bearing surface, the slider assembly is polished with slurry. The main material of the slider assembly is sintered alumina-titanium carbide and the read/write head consists of sputtered alumina and other soft metals. The rate of materials removal during polishing is slightly higher in the sputtered alumina and the other soft metals. This causes the surface near the read/write head to be slightly recessed. This is commonly referred to as "pole tip recession." Additionally, alumina-titanium carbide and sputtered alumina each also have a slightly different coefficient of thermal expansion. At relatively cold temperatures, the surface near the read/write head further recesses due to this disparity in thermal expansion coefficients.

As a result thereof, for a given fly height, the amount of pole tip recession will influence the resulting head-to-disk spacing of the disk drive. For example, for a 30 Gbits/in$^2$ areal density disk drive, the nominal pole tip recession can be approximately 4 nanometers, carbon thickness on the read/write head is about 4 nanometers, fly height can be approximately 13 nanometers, carbon thickness of the storage disk can be roughly 4 nanometers and half of the magnetic layer is about 10 nanometers. Thus, the total head-to-disk spacing in this example is approximately 35 nanometers.

Further, a large variation in fly height from slider assembly to slider assembly can cause significant issues in the manufacturing and reliability of the disk drives. If the fly height deviates positively and significantly from the target fly height, the head-to-disk spacing may become too large and can cause unreliable reading from and writing to the storage disk. Conversely, if the fly height deviates negatively and significantly from the target fly height, the head can contact the carbon surface of the storage disk.

Maintaining a relatively small and consistent head-to-disk spacing is further complicated by other factors. In particular, the read/write head includes a read head and a spaced apart write head. The write head includes an electrically conductive write element, a leading pole having a leading pole tip, a trailing pole having a trailing pole tip, and one or more electrical insulating layers that surround the write element. The space between the leading pole tip and the trailing pole tip is known as the write head gap. Further, a yoke forms an arch from the leading pole to the trailing pole. Conventional write elements often include a coil wound around the yoke. During a write operation, current is directed through the write element. The current generates a magnetic flux that propagates along the yoke to the pole. The magnetic flux generates a magnetic filed at the write head gap that is used to record digital information to the storage disk.

The electrical resistance of the write element generates heat in and around the read/write head. The extent and rate of heating depends upon the level of current sent to the write element. The temperature at the pole tips and surrounding areas of the slider assembly increases over time and eventually reaches a maximum temperature during writing. This temperature increase causes the trailing pole tip and/or other portions of the slider assembly to expand and protrude during writing in a direction generally toward the storage disk. This phenomenon is known as "thermal protrusion" or "thermal pole tip protrusion". If the extent of thermal protrusion is as great as the fly height, the slider assembly can contact the storage disk. This contact can cause off-track writing, damage to the slider assembly, damage to the storage disk and/or a permanent loss of data. Thus, thermal protrusion limits how low the fly height can be designed for a disk drive.

Attempts to limit the extent of thermal protrusion include decreasing resistance in the write element, thereby reducing the amount of heat transferred to the trailing pole. These efforts included providing a more tightly wound write element and using thicker coil materials. Another attempt to inhibit the adverse effects of thermal pole tip protrusion includes using a single layer coil rather than the conventional two-layer coil, in order to reduce heat buildup near the coil and encourage greater heat conduction to the surrounding areas of the slider assembly. A further attempt to reduce thermal protrusion includes replacing one of the insulating layers, which normally includes a photoresist material of relatively high coefficient of thermal expansion, with material having a lower coefficient of thermal expansion, such as alumina. Still another attempt to decrease thermal protrusion includes using a thinner undercoat layer between the body section and the read/write head. Unfortunately, these attempts have met with somewhat limited success.

In light of the above, the need exists to provide a disk drive that allows for the precise adjustment and control of the head-to-disk spacing. A further need exists to provide a disk drive that allows for a relatively high fly height, thereby decreasing the likelihood of damage to the slider assembly and/or loss of data from the storage disk. Another need exists to manufacture a reliable and cost effective disk drive that provides increased accuracy during data transfer.

SUMMARY

The present invention is directed to a disk drive including a slider assembly that magnetically interacts with a storage disk during data transfer. In one embodiment, the slider assembly includes (i) a write element having a first end, a second end and an intermediate section positioned between the first end and the second end, (ii) a conductor that is connected to the intermediate section, and (iii) a controller that directs electrical current through the conductor to heat the write element without writing data to the storage disk. The conductor can be connected to the intermediate section approximately at a midpoint along the intermediate section.

The electrical current can be directed through the conductor during a seek mode, during a settle mode, during reading, at any time prior to writing data to the storage disk, or at other times during operation of the disk drive. Further, the electrical current can remain substantially constant during the read operation. The electrical current can be direct current, alternating current, or a combination of both at alternate times. Heating the write element causes a controlled deformation of the slider assembly in a direction generally toward the storage disk. With this design, the head-to-disk spacing is dynamically and selectively decreased, providing greater accuracy during data transfer.

In another embodiment, the disk drive includes a slider assembly having a read/write head and a slider deformer. In this embodiment, electrical current is selectively directed to the slider deformer to cause a controlled deformation of the slider assembly toward the storage disk. The controller can selectively direct current to the slider deformer during the seek mode, settle mode, and/or during data transfer, and at other times during operation of the disk drive.

The slider deformer can include a material that is electrically conductive. The slider deformer can be substantially planar shaped, coil shaped or serpentine-shaped. Alternately, the slider deformer can be a piezoelectric element.

In one embodiment, the slider assembly includes a sensor that senses the temperature of a portion of the slider assembly. Information regarding the temperature of the slider assembly is provided to the controller, which can adjust the current to dynamically adjust the amount of the deformation of the slider assembly and dynamically adjust the head-to-disk spacing.

The present invention also includes a method for controlling head-to-disk spacing of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2K is a graphical representation of head-to-disk spacing and current as a function of time during a write operation;

FIG. 2L is a graphical representation of head-to-disk spacing and current as a function of time during a read operation;

FIG. 3D is a graphical representation of head-to-disk spacing and current as a function of time during a write operation;

FIG. 3E is a graphical representation of head-to-disk spacing and current as a function of time during a read operation;

DESCRIPTION

The present invention provides a method and apparatus for selectively heating a slider assembly of a disk drive. By timely heating the slider assembly before and during read and/or write operations, a controlled thermal deformation of the slider assembly occurs. The controlled deformation is used to dynamically adjust the head-to-disk spacing of the slider assembly.

Figure 1:
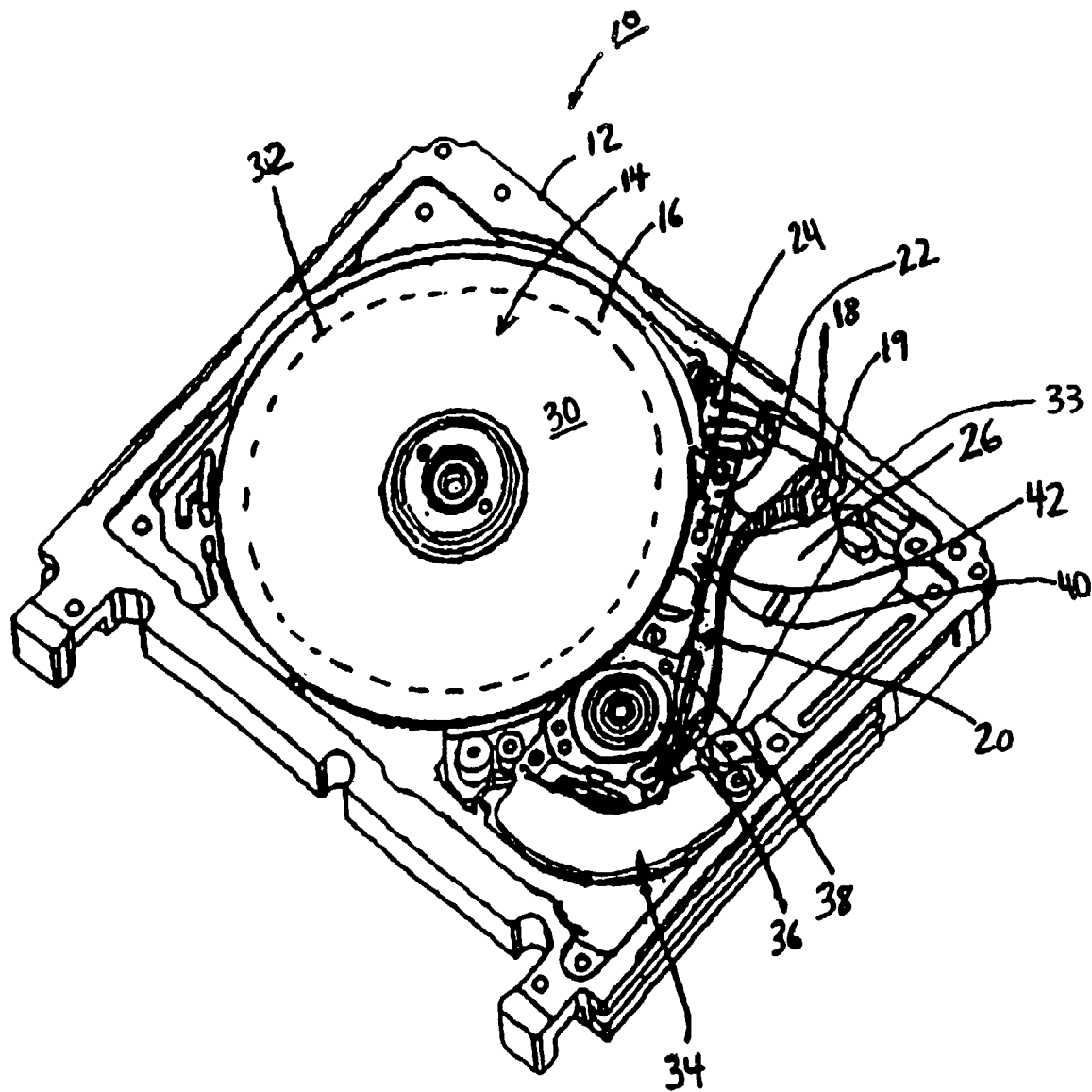
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, and (iv) a head stack assembly 20 including one or more head suspension assemblies 22, each having a slider assembly 24.

Each storage disk 16 includes one or more disk surfaces 30 that each has a plurality of concentric data tracks (only a target data track 32 is shown in FIG. 1) that store data. The target data track 32 in this embodiment is illustrated in phantom because it is on the bottom side of the storage disk 16.

The disk drive 10 can perform a read operation during which data is read from the storage disk 16, or a write operation during which data is transferred to the storage disk 16. The read and write operations each include a seek mode during which the head stack assembly 20 rapidly moves the slider assembly 24 to near the target track 32. Seek times are typically between approximately 3–10 milliseconds, although this time can vary. The read and write operations can also include a settle mode which commences once the slider assembly 24 is positioned proximate the target track 32. The settle mode typically lasts less than approximately 2 milliseconds. Further, the read and write operations include a track following mode once the slider assembly 24 has settled or stabilized over the target track 32. Additionally, once the slider assembly 24 stabilizes over the target track 32, the transfer of data between the slider assembly 24 and the storage disk 16 can commence.

The drive circuitry 18 sends and/or receives electrical current from the slider assembly 24 during read and/or write operations of the disk drive 10. The drive circuitry 18 can include a controller 19. In one embodiment, the controller 19 directs current to the slider assembly 24 to dynamically adjust and control the head-to-disk spacing.

In the embodiment illustrated in FIG. 1, the drive circuitry 18, is positioned near the head stack assembly 20. The drive circuitry 18 and/or the controller 19 can alternately be included in a printed circuit board assembly (not shown) on an opposite side of the drive housing 12. Moreover, although the controller 19 is illustrated in FIG. 1 as part of the drive circuitry 18, the drive circuitry 18 and the controller 19 can be formed from separate circuitry in the disk drive 10. Alternately, the drive circuitry 18 can perform the functions of the controller 19. Further, the drive circuitry 18 can include one or more preamplifiers that can adjust the electrical signals that are transmitted between the slider assembly 24 and the controller 19.

The head stack assembly 20 includes a conductor array 33 that electrically connects the drive circuitry 18 with the slider assembly 24. The conductor array 33 includes a plurality of conductors that carry electrical signals between the drive circuitry 18 and the slider assembly 24.

The head stack assembly 20 illustrated in FIG. 1 also includes an actuator motor 34, an actuator hub 36, one head suspension assembly 22, and one actuator arm 38. The actuator motor 34 rotates the actuator arm 38 and the head suspension assembly 22 relative to the storage disk 16. The head stack assembly 20, alternately, can include a plurality of actuator arms 38 that each supports up to two head suspension assemblies 22. Each head suspension assembly 22 includes the slider assembly 24 and a suspension 40 that has a load beam 42 and a flexure (not shown). The suspension 40 is secured to the actuator arm 38, and supports the slider assembly 24 proximate one of the disk surfaces 30 of the storage disk 16.

The slider assembly 24 transfers information between the drive circuitry 18 and the storage disk 16. The design of the slider assembly 24 can vary pursuant to the teachings provided herein.

Figure 2A:
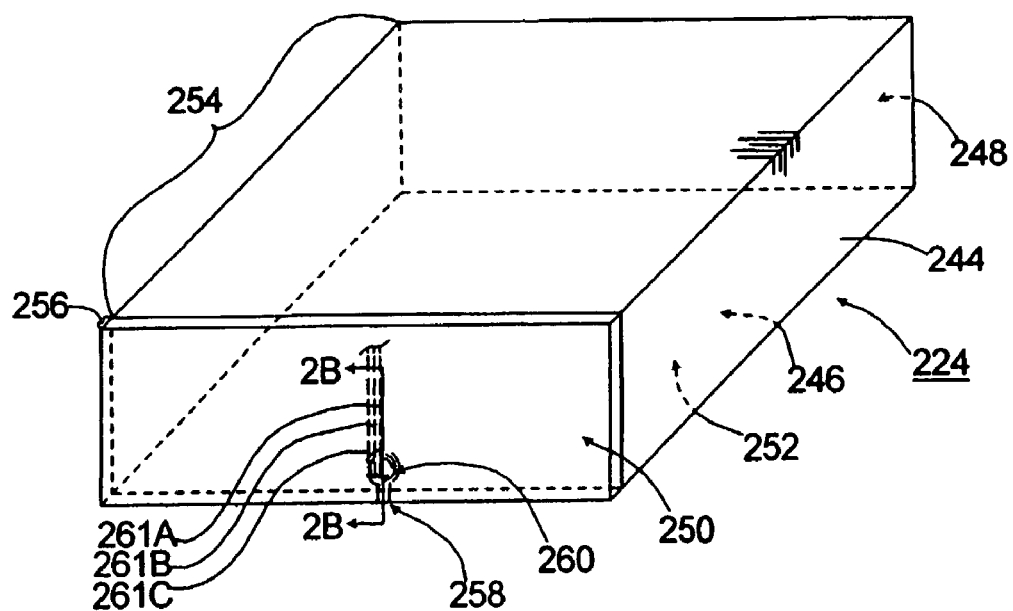
FIG. 2A is a perspective view of a slider assembly having features of the present invention.

FIG. 2A illustrates a rear perspective view of a first embodiment of the slider assembly 224. The slider assembly 224 includes a slider exterior surface 244 and a slider interior region 246. The slider exterior surface 244 defines the bounds of the slider interior region 246. The exterior surface 244 includes a leading surface 248, an opposed trailing surface 250 and a bottom first surface 252, which forms an air bearing surface (ABS).

Further, the slider assembly 224 includes a body section 254, and a transducer section 256 that includes a read/write head 258. The body section 254 volumetrically represents the vast majority of the slider assembly 224. For example, the body section 254 can comprise at least 95 percent of the total volume of the slider assembly 224. The body section 254 can be formed from various ceramic materials including a composition of alumina and titanium-carbide, for instance.

The transducer section 256 is positioned toward the back end of the slider assembly 224. The read/write head 258 includes a write element 260 (shown in phantom in FIG. 2A). Although the write element 260 is shown substantially centrally positioned along the transducer section 256 of the slider assembly 224, the write element 260 can be positioned on either side of the center of the transducer section 256.

In FIG. 2A, the slider assembly 224 includes a plurality of conductors, namely, a first conductor 261A, a second conductor 261B and a third conductor 261C (each conductor is shown in phantom). The conductors 261A–C are electrically connected to the drive circuitry 18 (illustrated in FIG. 1) via the conductor array 33 (illustrated in FIG. 1) and the write element 260.

Figure 2B:
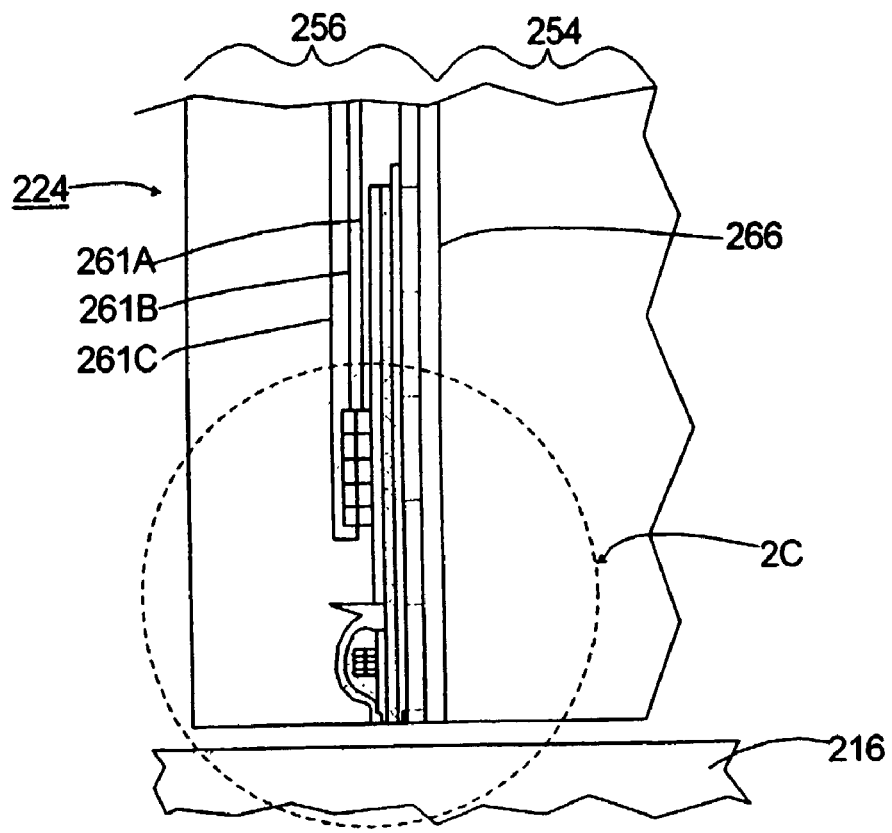
FIG. 2B is a partial cross-sectional view taken on line 2B—2B in FIG. 2A and a storage disk.

FIG. 2B is a partial cross-sectional view of the slider assembly 224 of FIG. 2A positioned near a storage disk 216. The body section 254 includes a rear body surface 266 to which the transducer section 256 is secured. During production, the transducer section 256 is layered onto the rear body surface 266. The transducer section 256 includes a plurality of different materials that are successively added in layers to form the components of the transducer section 256. For example, each layer can be added by electroplate deposition, sputter deposition, or other suitable methods. In this embodiment, the conductors 261A–C are positioned substantially within the transducer section 256 and are formed during the layering process.

Figure 2C:
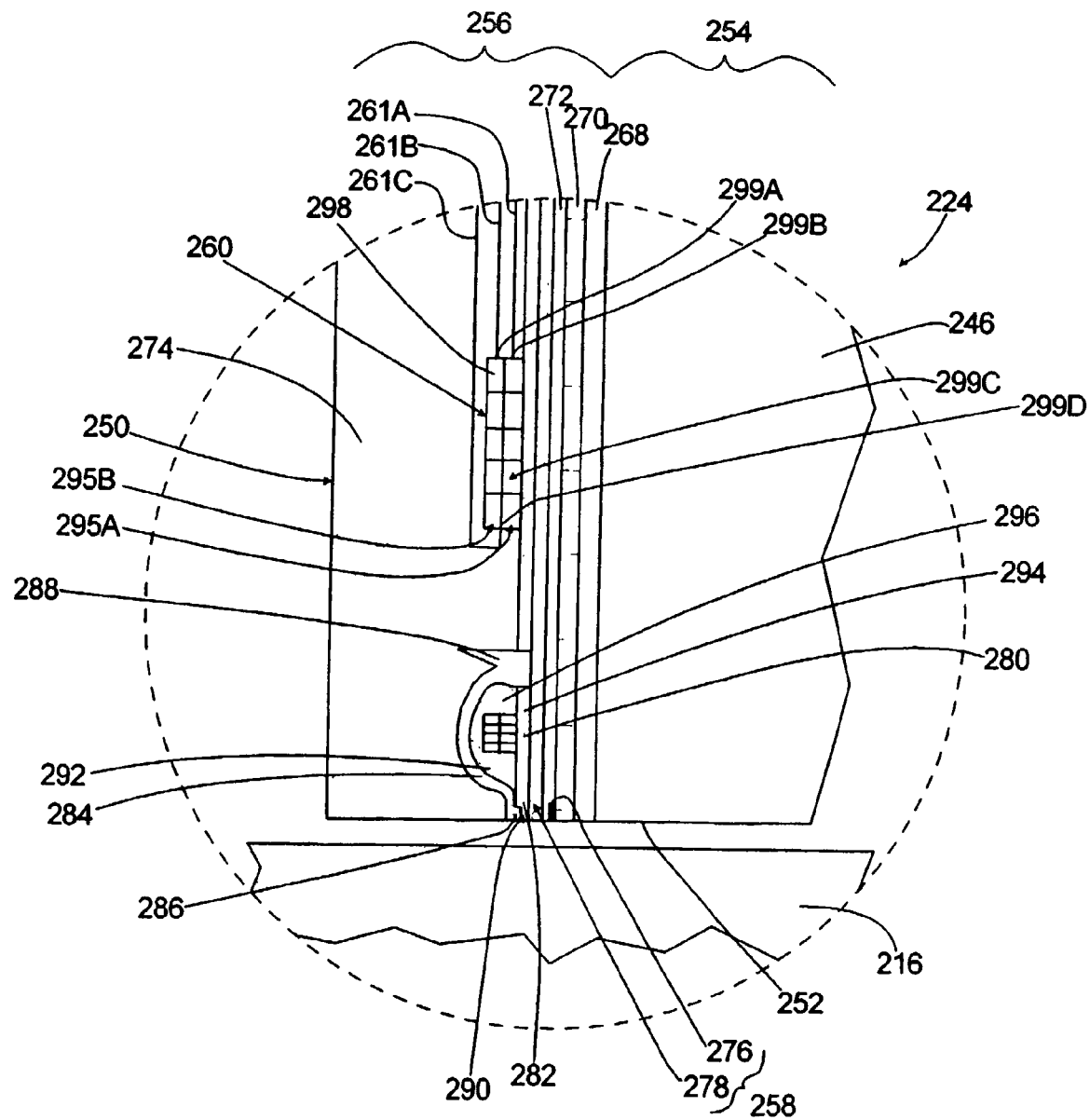
FIG. 2C is an enlarged detail view taken from dashed circle 2C in FIG. 2B.

FIG. 2C is an enlarged view of the portion of the slider assembly 224 and a portion of a storage disk 216 from FIG. 2B. In this embodiment, the transducer section 256 includes an electrically insulating undercoat layer 268, a first shield 270, a second shield 272, the read/write head 258 and an overcoat layer 274. The read/write head 258 includes a magneto-resistive head 276 (also known as an MR head or a read head) and a write head 278. The MR head 276 is positioned between the shields 270, 272. Alternately, the number and orientation of the layers can be different.

The undercoat layer 268 is formed from a suitable material such as alumina, and can have a thickness of between approximately 1.0 and 6.0 microns, although the thickness can be greater or lesser than thicknesses within this range.

The design and number of the shields 270, 272 can be varied depending upon the requirements of the slider assembly 224. The shields 270, 272 are substantially parallel to each other, and are generally planar. The shields 270, 272 extend away from the bottom surface 252 into the slider interior region 246. The shields 270, 272 are separated by an electrically insulating layer typically formed from alumina. The shields 270, 272 assist in magnetically separating the MR head 276 from the write head 278. Further, the shields 270, 272 protect the MR head 276 from being influenced by other extraneous magnetic fields that may exist within or near the transducer section 256. Each shield 270, 272 can be formed from a high permeability metallic material such as a nickel-iron alloy, and can have a thickness of between approximately 1.5 and 4.0 microns.

The MR head 276 receives and reads information from the rotating storage disk 216. The information is tranferred to the drive circuitry 18 (illustrated in FIG. 1) for further processing.

The overcoat layer 274 is a relatively thick layer of material that forms the back end of the slider assembly 224. The overcoat layer 274 extends to form the trailing surface 250 of the slider assembly 224. The overcoat layer 274 protects and electrically insulates the read/write head 258 and the other layers in the transducer section 256 from direct contact by any materials such as dust or other particulates. The overcoat layer 274 can be formed from various materials such as alumina, for example. The thickness of the overcoat layer 274 can vary, but is generally between 15 and 25 microns.

The positioning and design of the write head 278 can be varied. In FIG. 2C, the write head 278 includes a leading pole 280 having a leading pole tip 282, a trailing pole 284 having a trailing pole tip 286, a yoke 288, and a write head gap 290.

In this embodiment, the leading pole 280 is positioned adjacent to, but spaced slightly apart from, the second shield 272. A non-magnetic layer, typically alumina, separates the leading pole 280 from the second shield 272. The leading pole 280 is generally planar, and extends approximately from the bottom surface 252 into the slider interior region 246, substantially parallel to the shields 270, 272. The leading pole tip 282 is positioned proximate the bottom surface 252.

As illustrated in FIG. 2C, the trailing pole 284 has a somewhat curved cross-sectional shape. Near the bottom surface 252, the trailing pole tip 286 extends toward the leading pole tip 282, leaving a space between the pole tips 282, 286, known as the write head gap 290. The leading pole 280 and the trailing pole 284 are connected by the yoke 288, which forms an arch between the poles 280, 284. The write element 260 is coiled around the yoke 288. The trailing pole 284 bows away from the leading pole 280 to define an interpole region 292 between the poles 280, 284.

The poles 280, 284 can be formed from various metals such as a nickel-iron alloy. The poles 280, 284 can have a thickness that is less than approximately 4.0 microns. However, other thicknesses are possible.

In addition, the write head 278 also includes a first insulator layer 294 and a second insulator layer 296. The first insulator layer 294 is positioned substantially adjacent to the leading pole 280, and extends generally parallel to the leading pole 280. As illustrated in FIG. 2C, a portion of the second insulator layer 296 is positioned within the interpole region 292. The first insulator layer 294 can be formed from various materials including alumina, for example.

The write element 260 includes a plurality of coil turns 298. The number of coil turns 298 can vary, but normally includes between six and twelve coil turns 298. In the embodiment illustrated in FIG. 2C, the write element 260 includes eight coil turns 298. The write element 260 can be arranged to form two layers of coil turns 298, as shown in FIG. 2C. A first layer 295A of coil turns 298 of the write element 260 is positioned adjacent to the first insulator layer 294 and a second layer 295B of coil turns 298 is positioned adjacent to the second insulator layer 296. Alternatively, the write element 260 can include more or less than two layers of coil turns 298.

Additionally, the write element 260 includes a first end 299A, a second end 299B and an intermediate section 299C that is positioned between the first end 299A and the second end 299B. The intermediate section 299C includes a midpoint 299D positioned between the first end 299A and the second end 299B of the write element 260. In the embodiment illustrated in FIG. 2C, the first conductor 261A is connected to the first end 299A of the write element 260, the second conductor 261B is connected to the second end 299B of the write element 260, and the third conductor 261C is connected to the intermediate section 299C, and can be connected at or near the midpoint 299D of the intermediate section 299C.

The second insulator layer 296 covers the first layer 299A of coil turns 298 of the write element 260, and the second layer 299B of coil turns 298 is then connected to the first layer 299A of coil turns 298 to form the write element 260. The second insulator layer 296 also surrounds and electrically insulates the second layer 299B of coil turns 298. A portion of the second insulator layer 296 is positioned within the interpole region 292. The second insulator layer 296 can be formed from various materials such as photoresist, as one example.

During a write operation, electrical current is directed from the drive circuitry 18 (illustrated in FIG. 1) via two or more of the conductors 261A–C to the write element 260. As an overview, in this embodiment, (i) in a write mode, the drive circuitry 18 directs current to the write element 260 to write data to the storage disk 216, and (ii) in an adjustment mode, the drive circuitry 18 directs current to the write element 260 to dynamically adjust the head-to-disk spacing in preparation for reading and/or writing of data.

Figure 2D:
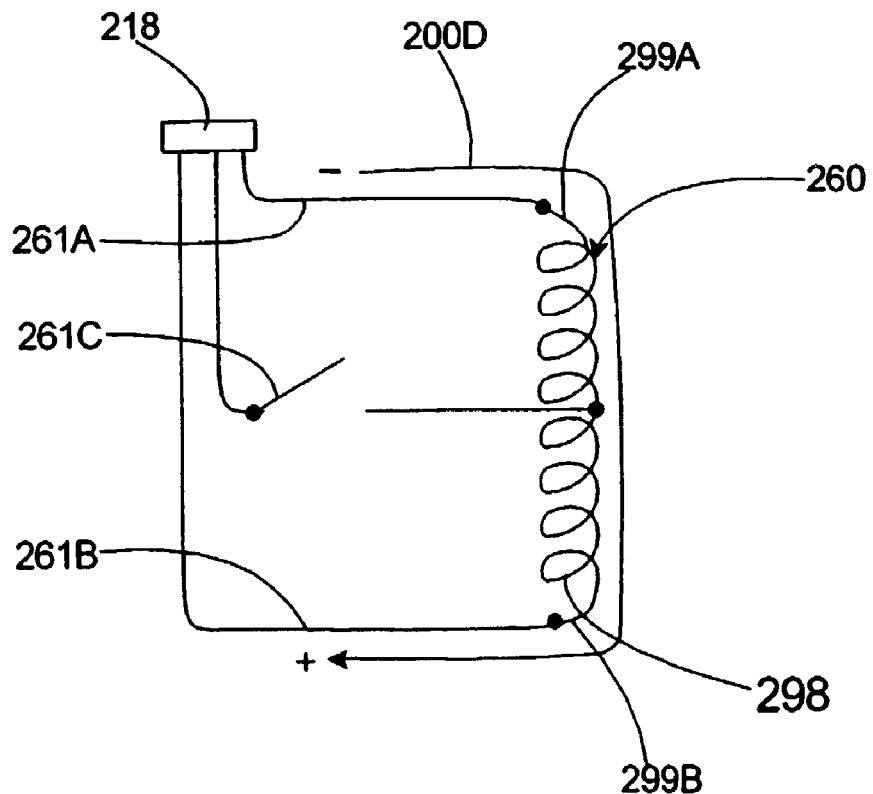
FIG. 2D is a simplified, partial circuit diagram illustrating current flow in a write element during a write mode.

FIG. 2D is a simplified, partial circuit diagram of the conductors 261A–C and the coil turns 298 of the write element 260 of FIG. 2C and drive circuitry 218. In the write mode, the drive circuitry 218 directs current to the coil turns 298 to write data to the storage disk 216 (illustrated in FIG. 2C). More specifically, the drive circuitry 218 can direct current to the write element 260 so that the current flows between the ends 299A, 299B of the coil turns 298. For example, in FIG. 2D, the drive circuitry 218 directs current so that the current flows (i) from the drive circuitry 218 through the first conductor 261A to the first end 299A of the coil turns 298, (ii) through the coil turns 298 to the second end 299B, and (ii) to the drive circuitry 218 via the second conductor 261B. In FIG. 2D, flow is indicated by directional arrow 200D. In the write mode, no current flows through the third conductor 261C.

Figure 2E:
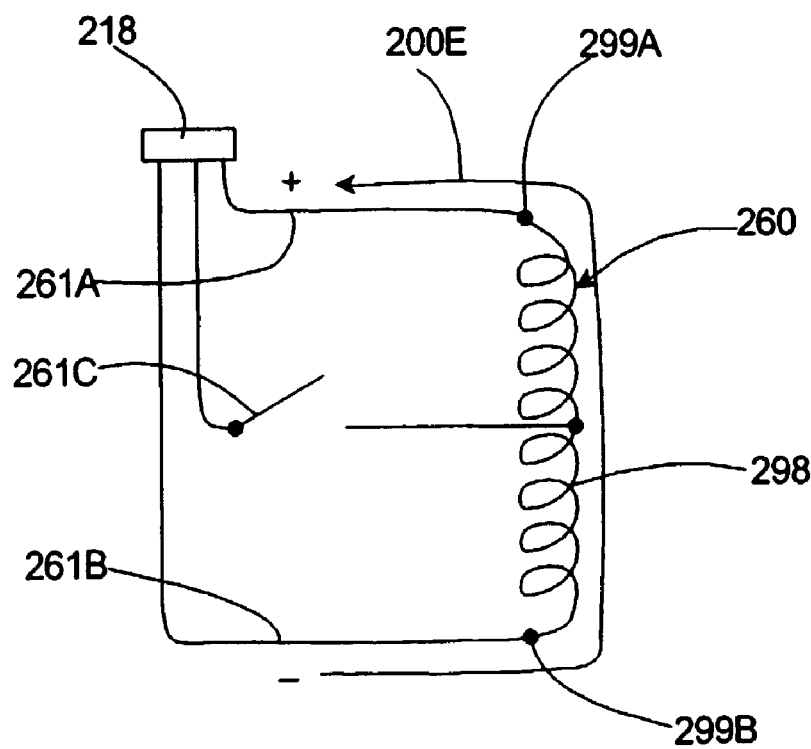
FIG. 2E is a simplified, partial circuit diagram further illustrating current flow in a write element during write mode.

FIG. 2E is another simplified circuit diagram of the conductors 261A–261C, the drive circuitry 218 and the write coil 260. FIG. 2E illustrates that in the write mode, the direction of the current can be reversed (as indicated by directional arrow 200E) through the coil turns 298. In FIG. 2E, the drive circuitry 218 directs current so that the current flows (i) from the drive circuitry 218 through the second conductor 261B to the second end 299B of the coil turns 298, (ii) through the coil turns 298 to the first end 299A, and (ii) to the drive circuitry 218 via the first conductor 261A.

During a write operation, electrical current is directed from the drive circuitry 218 in continuously alternating directions through the coil turns 298. When the current flows between the ends 299A, 299B as illustrated in FIGS. 2D and 2E, a coil magnetic field is generated in the coil turns 298 that induces a magnetic flux in the yoke 288 (illustrated in FIG. 2C). The magnetic flux produces a gap magnetic field at the write head gap 290 (illustrated in FIG. 2C). The gap magnetic field interacts with the magnetic film on the storage disk 216 (illustrated in FIG. 2C) to form a magnetic transition. Stated another way, the gap magnetic field transfers data to the storage disk 216.

In the write mode, the drive circuitry 218 can direct alternating current (AC), or direct current (DC) through the coil turns 298. In an alternative embodiment, the electrical current can be a combination of both direct current and alternating current. In the write mode, the frequency can be greater than approximately zero MHz. The frequency can vary, and can depend upon other factors such as the type of drive circuitry 218 and the preamplifier(s) used.

Figure 2F:
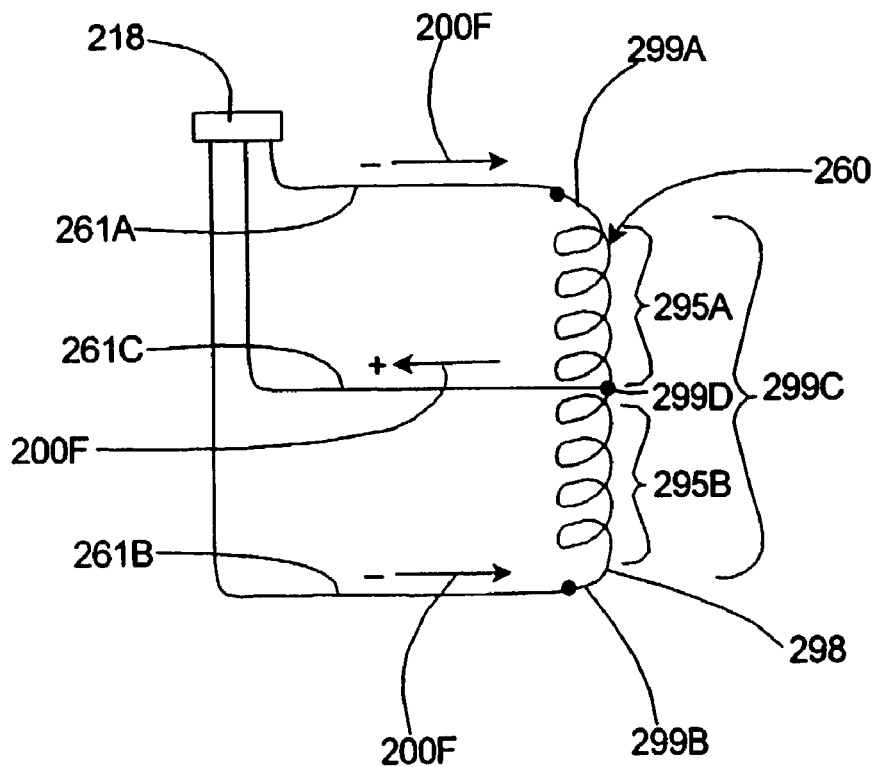
FIG. 2F is a simplified, partial circuit diagram illustrating current flow in the write element during an adjustment mode.

FIG. 2F is another simplified, partial circuit diagram of the conductors 261A–C, the coil turns 298 of the write element 260 and the drive circuitry 218. In the adjustment mode, the drive circuitry 218 directs current to the coil turns 298 to dynamically adjust the head-to-disk spacing in preparation for reading and/or writing data. In the adjustment mode, the write element 260 functions as a slider deformer. More specifically, the drive circuitry 218 can direct current to the write element 260 so that (i) the current flows between the first end 299A and the midpoint 299D of the intermediate section 299C and (ii) the current flows between the second end 299B and the midpoint 299D of the intermediate section 299C. For example, in FIG. 2F, the drive circuitry 218 directs current so that the current flows (i) from the drive circuitry 218 through the first conductor 261A to the first end 299A of the coil turns 298, (ii) through the first layer 295A of the coil turns 298, and (ii) to the drive circuitry 218 via the third conductor 261C. Further, the drive circuitry 218 directs current so that the current flows (i) from the drive circuitry 218 through the second conductor 261B to the second end 299B of the coil turns 298, (ii) through the second layer 295B of the coil turns 298, and (ii) to the drive circuitry 218 via the third conductor 261C. In FIG. 2F, flow is indicated by directional arrow 200F.

Figure 2G:
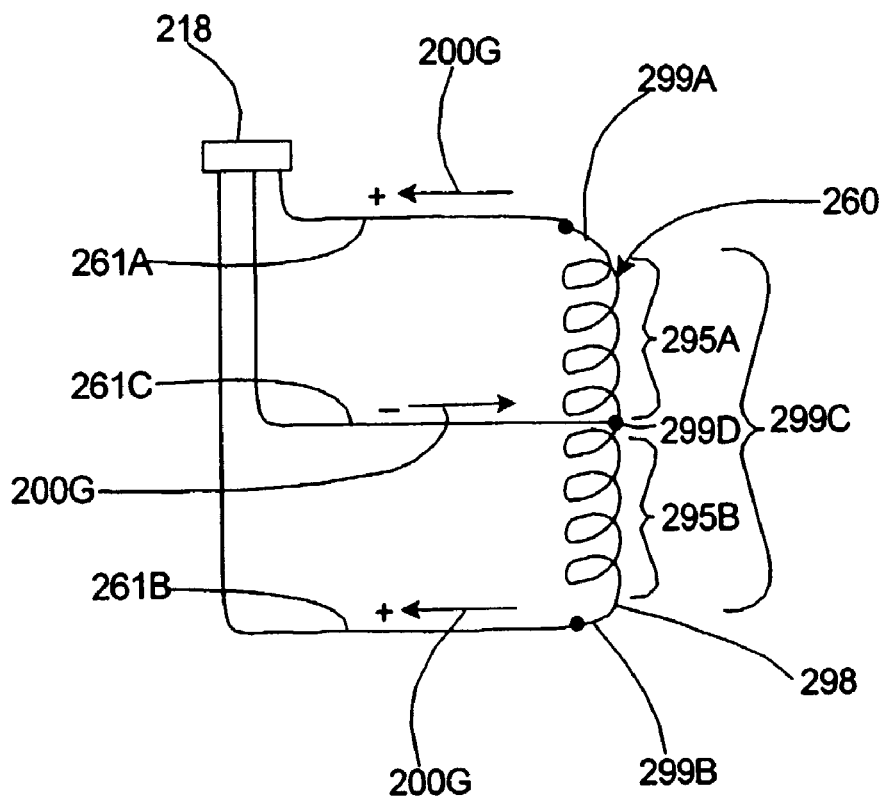
FIG. 2G is a simplified, partial circuit diagram further illustrating current flow in the write element during an adjustment mode.

FIG. 2G is another simplified circuit diagram of the conductors 261A–261C, the drive circuitry 218 and the write coil 260. FIG. 2G illustrates that in the adjustment mode, the direction of the current can be reversed (as indicated by directional arrow 200G) through the coil turns 298. In FIG. 2G, the drive circuitry 218 directs current so that the current flows (i) from the drive circuitry 218 through the third conductor 261C to the midpoint 299D of the intermediate section 299C, (ii) through the first layer 295A of the coil turns 298 to the first end 299A, (iii) through the second layer 295B of the coil turns 298 to the second end 299B, and (ii) to the drive circuitry 218 via the first conductor 261A and the second conductor 261A.

When the current flows as illustrated in FIGS. 2F and 2G, a first coil magnetic flux will be generated in the first layer 295A of turns 298 and a second coil magnetic flux will be generated in the second layer 295B of turns 298. In one embodiment, the first layer 295A of turns and the second layer 295B of turns are designed so that the second coil magnetic flux substantially cancels the first coil magnetic flux. Because the second coil magnetic flux substantially cancels the first coil magnetic flux, substantially no magnetic flux is created in the yoke 288 (illustrated in FIG. 2C) and no gap magnetic field is created at the write head gap 290 (illustrated in FIG. 2C). With no gap magnetic field, there is no transfer of data to the storage disk 216 (illustrated in FIG. 2C).

Therefore, in the adjustment mode, no magnetic transitions are written to the storage disk 216. However, when current flows in the write element 260 as illustrated in FIGS. 2F and 2G, heat is generated by the write element 260 that causes a thermal protrusion of a portion of the slider assembly 224. Stated another way, the temperature of the write element 260 is being increased as though the slider assembly 224 were writing to the storage disk 216, without any writing actually occurring. The amount of thermal protrusion can be controlled to precisely and dynamically adjust the head-to-disk spacing.

In the adjustment mode, the drive circuitry 218 can direct alternating current (AC), or direct current (DC) through the coil turns 298. In an alternative embodiment, the electrical current can be a combination of both direct current and alternating current. In the adjustment mode, the frequency can be greater than approximately zero MHz. The frequency can vary, and can depend upon other factors such as the type of drive circuitry 218 and the preamplifier(s) used.

The timing of the preheating the write element 260 without writing data to the storage disk 216 can be varied. In one embodiment, the write element 260 can be fully or partly preheated whenever the disk drive 10 is powered up. In an alternate embodiment, the write element 260 is preheated only following the initiation of a specific command, such as a read or a write command, i.e. during seek mode. In one embodiment, the preheating of the write element 260 requires less than approximately 3 milliseconds. A typical seek mode is at least approximately 3 milliseconds. Thus, once the disk drive 10 has commenced track following mode immediately prior to reading or writing, the controlled thermal protrusion has already occurred.

Figure 2H:
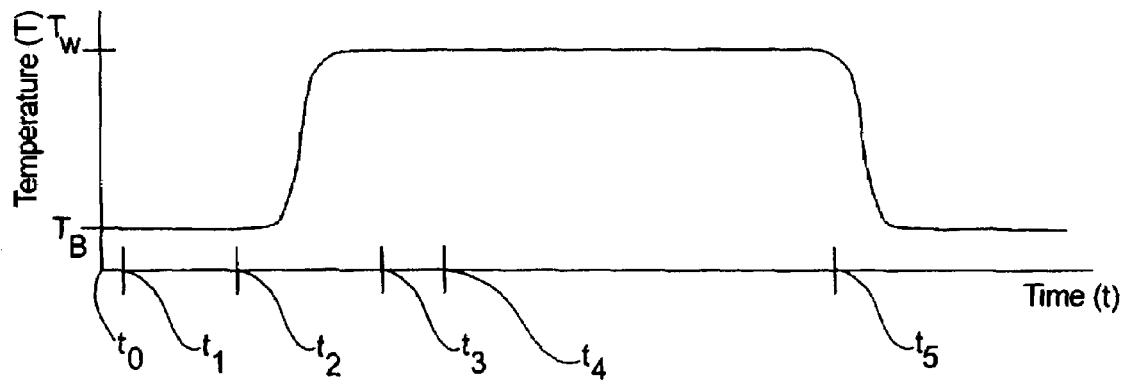
FIG. 2H is a graphical representation illustrating the temperature of the slider assembly as a function of time during a write operation.
Figure 2I:
FIG. 2I is a graphical representation illustrating the temperature of the slider assembly as a function of time during a read operation.

FIG. 2H is a graph that illustrates the temperature of the slider assembly near the write head relative to time prior to and during a write operation. At time $t_0$, prior to directing current to the slider assembly, the slider assembly is at a baseline temperature $T_B$. At time $t_1$, the write operation is initiated. At time $t_2$, the disk drive commences a seek mode. The seek mode continues until at time $t_3$ where the disk drive begins the settle mode. The settle mode continues until time $t_4$ where the disk drive begins the track following mode. During the seek move and/or the settle mode, e.g. time $t_2$–$t_4$, the drive circuitry begins to direct current to the write element in the adjustment mode. As a result thereof, during $t_2$–$t_4$, the temperature of the slider assembly near the write head increases from $T_B$ to $T_W$ without writing data to storage disk. Stated another way, once the disk drive switches to track following mode at time $t_4$, the temperature of the slider assembly has already increased to the writing temperature $T_W$. At time $t_4$, the disk drive is ready to begin writing. At this time, the drive circuitry directs current to the write element in the first mode, and writing commences. At time $t_5$, the drive circuitry ceases directing current to the write element and the temperature of the slider assembly decreases to the baseline temperature $T_B$.

Alternately, for example, during a write operation, the drive circuitry can direct current to the write element in the adjustment mode any time prior to writing data.

FIG. 21 is a graph that illustrates the temperature of the slider assembly near the read head relative to time prior to and during a read operation. At time $t_0$, prior to directing current to the slider assembly, the slider assembly is at a baseline temperature $T_B$. At time $t_1$, the read operation is initiated. At time $t_2$, and the disk drive commences a seek mode. The seek mode continues until at $t_3$ where the disk drive begins the settle mode. The settle mode continues until $t_4$ where the disk drive begins the track following mode. During the seek and/or the settle mode, e.g. time $t_2$–$t_4$, the drive circuitry directs current to the write element in the adjustment mode. As a result thereof, during $t_2$–$t_4$, the temperature of the slider assembly near the read head increases from $T_B$ to $T_R$ without writing data to storage disk. At time $t_4$, the disk drive is ready to begin reading data. At this time, the drive circuitry can continue to direct current to the write element in the second mode without transferring data to the storage disk to maintain the temperature at $T_R$ during reading. At time $t_5$, reading is completed, the drive circuitry ceases directing current to the write element and the temperature of the slider assembly decreases to the baseline temperature $T_B$.

Alternately, for example, during a read operation, the drive circuitry can direct current to the write element in the adjustment mode during the seek mode, namely $t_1$–$t_2$, or any time prior to reading data. Still alternately, the drive circuitry can discontinue directing current to the write element during reading of data, $t_4$–$t_5$. In another embodiment, during reading of data, the current directed to the write element can be approximately 50%, 75%, 90%, 95%, 99%, or 100% of the current directed to the write element prior to reading data.

Figure 2J:
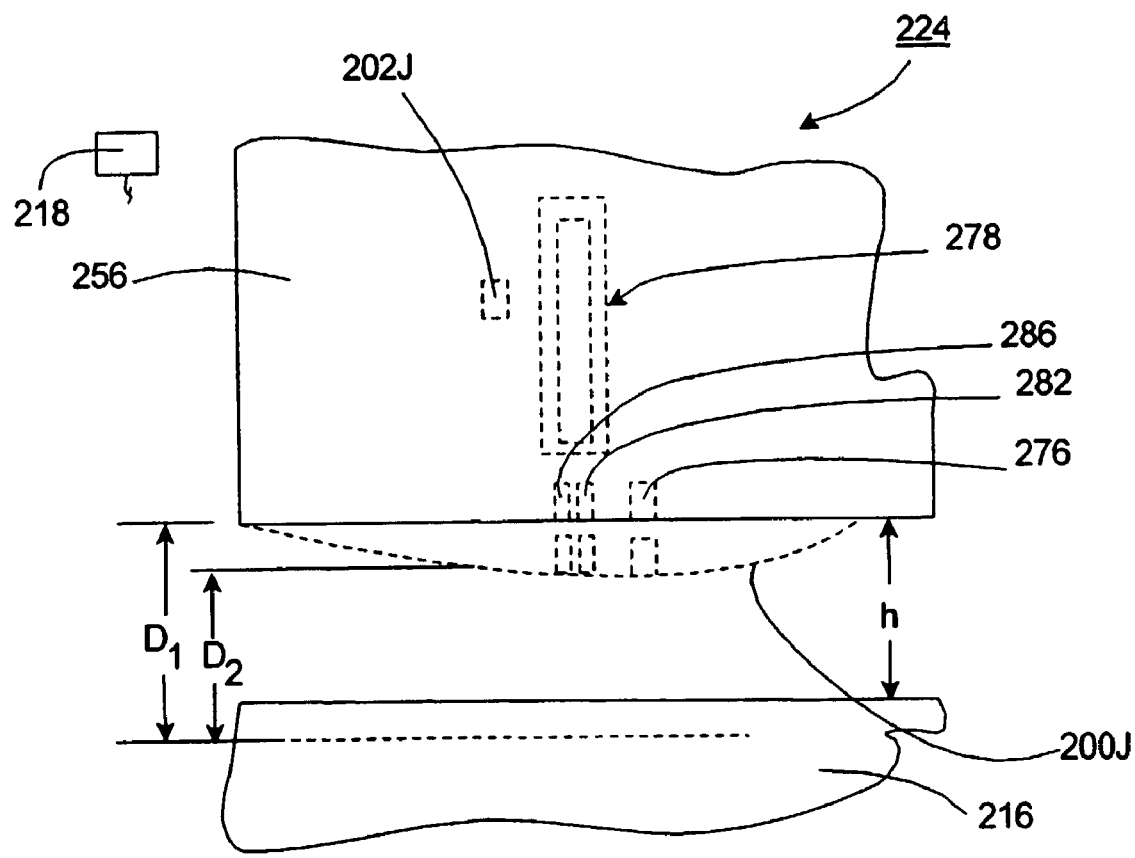
FIG. 2J is a partial side view that illustrates changes to head-to-disk spacing and drive circuitry.

Referring to FIG. 2J, the increase in temperature of the write element 260 (illustrated in phantom as a box) from $T_B$ to $T_W$ causes a thermal expansion of the write element 260. Further, the heat transfer to the surrounding areas of the slider assembly 224 causes a thermal expansion of the slider assembly 224 near the pole tips 282, 286 (illustrated in phantom as boxes) and the read head 276 (illustrated in phantom as a box). FIG. 2J illustrates the influence of the thermal expansion on the head-to-disk spacing. More specifically, FIG. 2J is a side illustration of a portion of the slider assembly 224, a portion of the storage disk 216, and the drive circuitry 218. Prior to the drive circuitry 218 directing current to the write element 260, the head-to-disk spacing is equal to $D_1$. When the drive circuitry 218 directs current to the write element 260, the resistance of the write element 260 generates heat that is transferred to nearby areas of the slider assembly 224. This results in thermal expansion, e.g. protrusion of the pole tips 282, 286, and the read head 276, as indicated by dotted line 200J and a reduction of the head-to-disk spacing to $D_2$. By preheating of the write element 260 as described above, the head-to-disk spacing can be dynamically adjusted in a controlled manner in preparation for data transfer. Stated another way, upon receiving a command to perform a data transfer operation, the drive circuitry 218 directs current to the write element 260, resulting in a controlled and predetermined amount of deformation of the transducer section 256 and movement to a desired head-to-disk spacing $D_2$ from the storage disk 16.

With this design, the nominal fly height "h" of the slider assembly 224 remains substantially constant during the data transfer operations.

The amount of deformation can be varied depending upon the geometry of the write element, as well as the amount of electrical current that is directed through the write element. The extent of the deformation can be calculated based on the properties of the material that is heated by the write element. For example, if the material near the write element 260 is formed from alumina, the extent of the deformation can be calculated as follows:

Assuming a coefficient of thermal expansion of alumina is $8.0 \times 10^{-6}$ per degree Kelvin, and a height of the transducer section 256 of the slider assembly 24 of $3.0 \times 10^{-4}$ meters, the maximum deformation toward the storage disk 216 is $$(8.0 \times 10^{-6}) \times (3.0 \times 10^{-4}) = 2.4 \times 10^{-9} \text{ meters/degree Kelvin} = 2.4 \text{ nanometers/degree Kelvin}.$$

This value must be halved, because assuming the entire height of the transducer section 256 is heated, deformation of the transducer section 256 will occur both in a direction toward the storage disk 216 and an opposing direction away from the storage disk 216. Thus, the maximum deformation of the transducer section 256 toward the storage disk 216 in this example is 1.2 nanometers per degree Kelvin. For instance, if the write element 260 heats the transducer section 256 by 10 degrees Kelvin, the deformation toward the storage disk 16 would be approximately 12 nanometers.

As provided herein, the preheating of the slider assembly 224 can be used to change the head-to-disk spacing any distance within the range of approximately 1 nm to 25 nm prior to reading or writing data. For example, preheating the slider assembly 224 can be used to change the head-to-disk spacing at least approximately 3 nm, 4 nm, 5 nm, 6 nm, 7 nm, 8 nm, 9 nm, 10 nm, 11 nm, 12 nm, or 13 nm. Stated another way, preheating the slider assembly 224 can be used to change the head-to-disk spacing by at least approximately 10%, 20%, 40%, 50%, 60% or 70%. The head-to-disk spacing $D_2$ during data transfer is dependent in part upon the desired areal density of the storage disk 16. It is recognized that the head-to-disk spacing $D_2$ can be as close to zero nanometers as possible without contacting the storage disk 16.

Once the design requirements have been predetermined for a specific disk drive 10, the specification for the nominal fly height "h" of the slider assembly 224 can be increased by a distance equal to or less than the maximum calculated deformation. For example, if the head-to-disk spacing can be decreased 12 nm by preheating with the write element 260, the nominal fly height can be increased by up to 12 nanometers. Therefore, if an original nominal fly height of the disk drive 10 was 13 nanometers, the nominal fly height in a disk drive 10 that incorporates the present invention could be approximately 25 nanometers without suffering any of the drawbacks of an increased fly height, such as track misregistration or data transfer errors. The increased fly height decreases the likelihood of the slider assembly 224 crashing into the storage disk 216.

In one embodiment, the disk drive 10 is calibrated during production or manufacturing to determine the amplitude and frequency of the current that the drive circuitry 218 should direct to each slider assembly 224 at various times to bring the head-to-disk spacing to the desired levels during a data transfer. This information can be stored in a lookup table in the firmware of the disk drive 10. Subsequently, during operation of the drive, the information from the lookup table can be utilized to direct the current at the appropriate time to each slider assembly 224 to bring the slider assembly 224 to the desired head-to-disk spacing. For example, in one embodiment, the drive circuitry 218 could direct a different current to each of the slider assemblies 224 to dynamically bring each of the slider assemblies 224 to the desired head-to-disk spacing at the appropriate time.

In another embodiment, the drive circuitry 218 can include a servo feedback loop that monitors the head-to-disk spacing. This can be accomplished by utilizing one or more sensors 202J (illustrated in phantom) to monitor the temperature of various locations of the slider assembly 224 to determine the extent of the deformation. The sensor 202J can be incorporated into the MR head 276, the write head 278 or can be an independent structure positioned within the slider assembly 24.

In another embodiment, the sensor can continually monitor the strength of the magnetic field received by the MR head 276 in order to determine the extent of deformation.

Information regarding the temperature and the head-to-disk spacing is utilized by the drive circuitry 218 to adjust the current that is directed to the slider assembly 224 during operation of the disk drive 10.

FIG. 2K is a graph that illustrates the head-to-disk spacing of the slider assembly near the write head and current in the write element relative to time prior to and during a write operation. At time $t_0$, prior to directing current to the slider assembly, the slider assembly is at a baseline head-to-disk spacing $D_1$. At time $t_1$, a write operation is initiated. At time $t_2$, the disk drive commences a seek mode. The seek mode continues until time $t_3$ when the disk drive begins the settle mode. The settle mode continues until $t_4$ when the disk drive begins the track following mode. During the seek and/or settle mode, e.g. time $t_2$–$t_4$, the drive circuitry begins directing current $I_A$ to the write element in the adjustment mode. As a result thereof, during $t_2$–$t_4$, the temperature of the slider assembly near the write head can increase without writing data to storage disk and the head-to-disk spacing near the write head decreases to $D_2$. Stated another way, once the disk drive switches to track following mode at time $t_4$, the head-to-disk spacing is $D_2$. At time $t_4$, the disk drive is ready to begin writing data. At this time, the drive circuitry directs current $I_W$ to the write element in the write mode, and writing commences. At time $t_5$, the drive circuitry ceases directing current to the write element. In FIG. 2K, $I_A$ is illustrated as being approximately equal to $I_W$. However, in alternate embodiments, 1A can be greater than $I_W$ or less than $I_W$.

FIG. 2L is a graph that illustrates the head-to-disk spacing of the slider assembly near the read head and current in the write element relative to time prior to and during a read operation. At time $t_0$, prior to directing current to the slider assembly, the slider assembly is at a baseline head-to-disk spacing $D_1$. At time $t_1$, a read operation is initiated. At time $t_2$, the disk drive commences a seek mode. The seek mode continues until time $t_3$ when the disk drive begins the settle mode. The settle mode continues until time $t_4$ when the disk drive begins the track following mode. During the seek and/or settle mode, e.g. time $t_2$–$t_4$, the drive circuitry begins directing current $I_A$ to the write element in the adjustment mode. As a result thereof, during $t_2$–$t_3$, the temperature of the slider assembly near the read head increases and the head-to-disk spacing near the read head decreases to $D_2$. Stated another way, once the disk drive switches to track following mode at time $t_4$, the head-to-disk spacing is $D_2$. At time $t_4$, the disk drive is ready to begin reading data. At this time, the drive circuitry continues to direct current $I_A$ to the write element in the adjustment mode, and reading commences. At time $t_5$, the drive circuitry ceases directing current to the write element. In FIG. 2L, $I_A$ is illustrated as being substantially constant from $t_2$–$t_5$. However, in an alternate embodiment, $I_A$ can be reduced during reading of data during time $t_4$–$t_5$.

In summary, during data transfer, the head-to-disk spacing is dynamically maintained at the desired level $D_2$. For example, during a write operation, current through the write element maintains the head-to-disk spacing at $D_2$. Alternately, during a read operation, current can still be directed through the write element to maintain the head-to-disk spacing at $D_2$. Once data transfer has been completed, the head-to-disk spacing can increase back to the $D_1$, thereby maintaining an increased head-to-disk spacing $D_1$ that decreases the likelihood of damage to the disk drive.

Figure 3A:
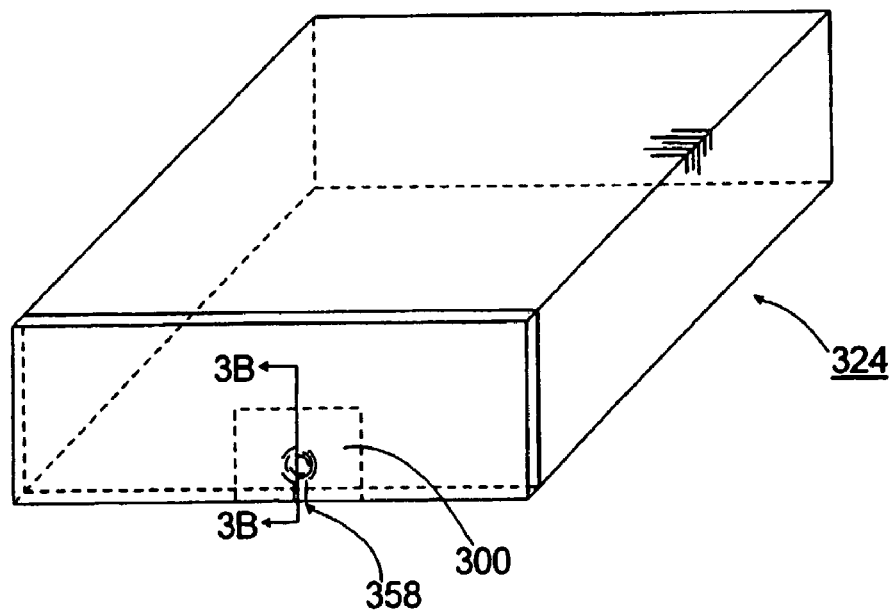
FIG. 3A is a perspective view of another embodiment of a slider assembly having features of the present invention.

FIG. 3A illustrates a rear perspective view of another embodiment of the slider assembly 324. In this embodiment, the slider assembly 324 includes a read/write head 358 and a slider deformer 300 (illustrated in phantom) that is used to selectively heat and deform the slider assembly 324 near the read/write head 358.

Figure 3B:
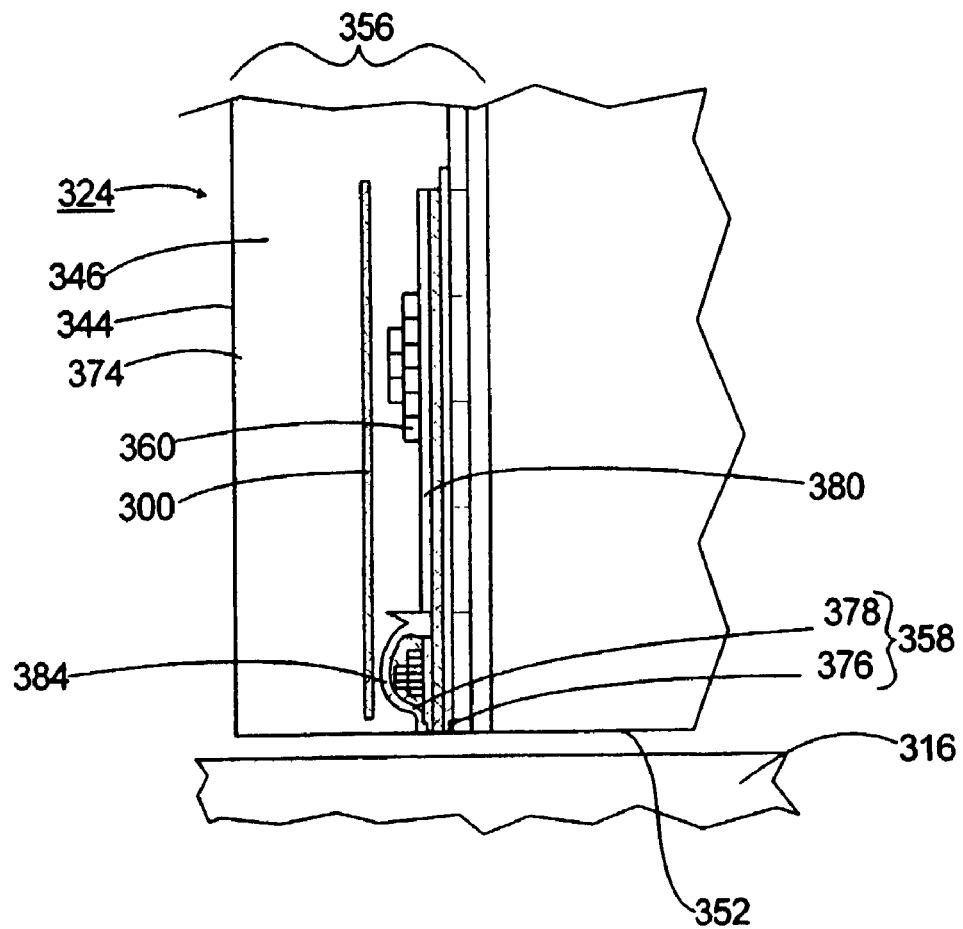
FIG. 3B is a partial cross-sectional view of the slider assembly taken on line 3B—3B in FIG. 3A and a storage disk.

FIG. 3B is a partial cross-sectional illustration of the slider assembly 324 shown in FIG. 3A, and a portion of a storage disk 316. FIG. 3B illustrates that the read/write head 358 includes a read head 376 and a write head 378. In this embodiment, (i) the read head 376 can be a prior art type read head, (ii) the write head 378 can be a prior art type, write head or a write head 378 as described above and illustrated in FIG. 2A.

The location of slider deformer 300 can be varied. In FIG. 3B, the slider deformer 300 is positioned in the transducer section 356 near the write head 378. More specifically, the slider deformer 300 is incorporated substantially within the overcoat layer 374 of the transducer section 356. Alternately, the slider deformer 300 can be positioned either partly or entirely outside the overcoat layer 374. For example, the slider deformer 300 can be positioned or in other regions of the slider assembly 324 or on the exterior surface 344 of the slider assembly 324, provided the slider assembly 324 near the read/write head 358 deforms toward the storage disk 316 to a suitable degree.

The positioning, composition and geometry of the slider deformer 300 can be varied to suit the design requirements of the slider assembly 324 and the disk drive 10. In the embodiment illustrated in FIG. 3B, the slider deformer 300 is a planar layer that is substantially parallel to the leading pole 380. Alternately, the slider deformer 300 can also be positioned in alternative ways that are not parallel to the leading pole 380. Moreover, although the slider deformer 300 illustrated in FIG. 3B extends to near the air bearing surface 352 of the slider assembly 324, other embodiments include a slider deformer 300 that can actually extend to the air bearing surface 352.

FIG. 3B illustrates that the slider deformer 300 is not in direct electrical communication with the write element 360. Stated another way, the slider deformer 300 is substantially electrically isolated from the write element 360, e.g. the slider deformer 300 is not in direct contact with the write element 360, nor is there any significant electrical coupling between the slider deformer 300 and the write element 360. For example, the distance between the slider deformer 300 and the trailing pole 384 can be up to 10 microns. In one embodiment, the closest distance between the slider deformer 300 and the trailing pole 384 is between 0.5 and 5.0 microns.

In one embodiment, the slider deformer 300 is formed from a material having a relatively low electrical resistivity and a relatively high electrically conductivity.

In alternate embodiments, the electrical resistivity of the slider deformer 300 can be less than approximately 10 micro ohm-centimeters, less than approximately 5 micro ohm-centimeters, less than approximately 3 micro ohm-centimeters, or less than approximately 2 micro ohm-centimeters. Suitable materials for the slider deformer 300 include aluminum, gold, copper and silver, as examples. Alternately, other suitable electrically conductive materials or semiconductive materials can be used as the slider deformer 300.

The slider deformer 300 can be sized and shaped to provide sufficiently rapid heating. For example, the thickness can be greater than approximately 0.1 microns. In another embodiment, the thickness can be approximately between 1.0 and 10.0 microns or greater.

Further, the slider deformer 300 can have a height dimension that extends into the interior region 346 of the slider assembly 324 a suitable distance so that extensive heating of the overcoat layer 374 can expeditiously occur. For instance, the slider deformer 300 can extend from near the air bearing surface 352, in a direction toward the slider interior region 346, to approximately 50–90 percent of the total height of the slider assembly 324. Alternately, the height of the slider deformer 300 can be greater than 90 percent or less than 50 percent of the height of the slider assembly 324.

Additionally, the width of the slider deformer 300 can extend laterally a suitable distance so that extensive heating of the overcoat layer 374 can expeditiously occur. For example, the slider deformer 300 can extend from 10–30 percent of the width of the slider assembly 324. Alternately, the width of the slider deformer 300 can be more than 30 percent or less than 10 percent of the width of the slider assembly 324.

Figure 3C:
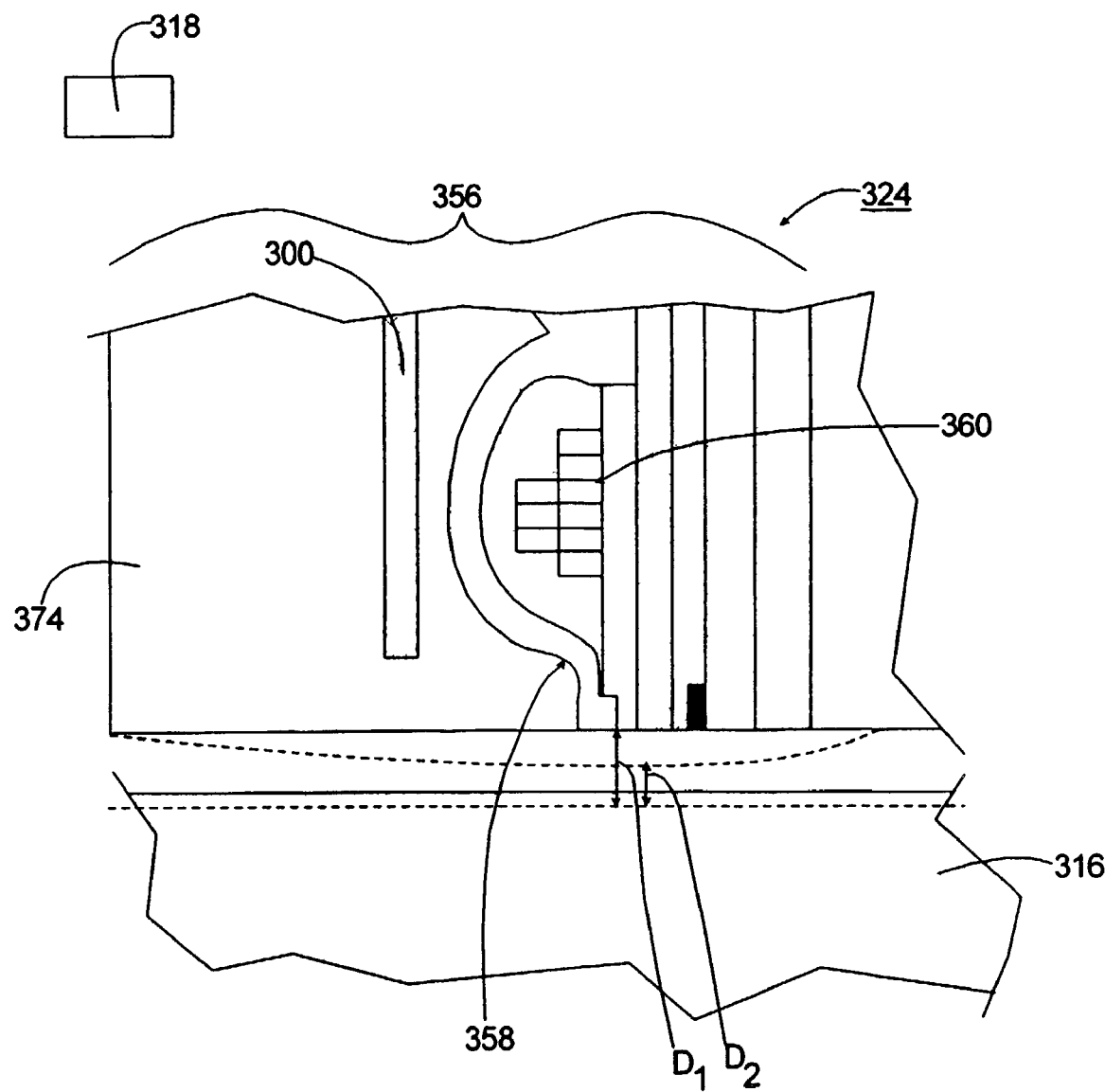
FIG. 3C is a partial side view that illustrates changes to head-to-disk spacing and drive circuitry.

FIG. 3C is a cross-section view of the slider assembly 324 positioned near the storage disk 316 and drive circuitry 318. More specifically, FIG. 3C illustrates the relationship between (i) the head-to-disk spacing $D_1$ without the drive circuitry 318 directing current to the slider deformer 300 and (ii) the resulting head-to-disk spacing $D_2$ that occurs after the drive circuitry 318 directs current to the slider deformer 300.

More specifically, current from the drive circuitry 318 causes the slider deformer 300 to generate heat independently from heat generated by the write element 360. The heat is transferred to the immediately surrounding overcoat layer 374 and the read/write head 358, thereby selectively causing thermal deformation of the transducer section 356 independently from the deformation caused by heating of the write element 360 during a write operation.

Among other applications, the slider deformer 300 can be used to decrease the head-to-disk spacing immediately following initiation of a data transfer command. For example, the drive circuitry 318 can direct current to the slider deformer 300 in a somewhat similar fashion as the drive circuitry 218 directs current to the write element 260 as described above. However, in this embodiment, the drive circuitry 318 can direct current simultaneously to the slider deformer 300 and the write element 360 during writing, if necessary, to maintain the desired head-to-disk spacing.

FIG. 3D is a graph that illustrates the head-to-disk spacing of the slider assembly near the write head, the temperature near the write head and current in the slider deformer and/or the write element relative to time prior to and during a write operation. At time $t_0$, prior to directing current $I_0$ to the slider assembly, the slider assembly is at a baseline head-to-disk spacing $D_1$ and a baseline temperature $T_B$. At time $t_1$, a write operation is initiated. At time $t_2$, the disk drive commences a seek mode. The seek mode continues until time $t_3$ where the disk drive begins the settle mode. The settle mode continues until $t_4$ where the disk drive begins the track following mode. During the seek mode and/or the settle mode, e.g. time $t_2$–$t_4$, the drive circuitry begins to direct current $I_A$ to the slider deformer. As a result thereof, during time $t_2$–$t_4$, the temperature of the slider assembly near the write head increases to $T_W$ and the head-to-disk spacing near the write head decreases to $D_2$. Stated another way, once the disk drive switches to track following at time $t_4$, the head-to-disk spacing is $D_2$. At time $t_4$, the disk drive is ready to begin writing data. At this time, the drive circuitry directs current $I_W$ to the write element and writing commences. Further, during writing, the drive circuitry can dynamically adjust the current directed to the slider deformer to maintain the temperature of the slider assembly at $T_W$ and/or maintain the head-to-disk spacing at $D_2$. With this design, (i) when current $I_W$ to the write element decreases, current in $I_A$ to the slider deformer increases, and (ii) when current to the write element increases, current $I_A$ to the slider deformer decreases. At time $t_5$, the drive circuitry ceases directing current $I_W$ to the write element, ceases directing current $I_A$ to the slider deformer, and the temperature of the slider assembly ultimately decreases to the baseline temperature $T_B$. In FIG. 3D, $I_A$ is illustrated as being less than $I_W$. However, in alternate embodiments, $I_A$ can be greater than $I_W$ or approximately equal to $I_W$. Moreover, the current fluctuations in FIG. 3D are somewhat exaggerated for clarity.

Alternately, for example, during a write operation, the drive circuitry can direct current to the slider deformer any time prior to writing data. Further, the disk drive could be designed so that no current or a constant current is directed to the slider deformer during the writing of data, namely time $t_4$–$t_5$.

FIG. 3E is a graph that illustrates the head-to-disk spacing of the slider assembly near the read head, the temperature near the read head and current in the slider deformer relative to time prior to and during a read operation. At time $t_0$, prior to directing current $I_0$ to the slider assembly, the slider assembly is at a baseline head-to-disk spacing $D_1$ and a baseline temperature $T_B$. At time $t_1$, a read operation is initiated. At time $t_2$, and the disk drive commences a seek mode. The seek mode continues until time $t_3$ where the disk drive begins the settle mode. The settle mode continues until time $t_4$ where the disk drive begins the track following mode. During the seek mode and/or the settle mode, e.g. time $t_2$–$t_4$, the drive circuitry begins to direct current $I_A$ to the slider deformer. As a result thereof, during time $t_2$–$t_4$, the temperature of the slider assembly near the read head increases to $T_R$ and the head-to-disk spacing near the read head decreases to $D_2$. Stated another way, once the disk drive switches to track following at time $t_4$, the head-to-disk spacing is $D_2$. At time $t_4$, the disk drive is ready to begin reading data. At this time, the drive circuitry continues directing current $I_A$ to the slider deformer and reading commences. Further, during reading, the drive circuitry can direct a substantially constant level of current to the slider deformer to maintain the temperature of the slider assembly at $T_R$ and/or maintain the head-to-disk spacing at $D_2$. At time $t_5$, the drive circuitry ceases directing current $I_A$ to the slider deformer, and the temperature of the slider assembly decreases to the baseline temperature $T_B$. In FIG. 3E, $I_A$ is illustrated as being substantially constant. However, in alternate embodiments, $I_A$ can fluctuate somewhat. Still alternately, during a read operation, the drive circuitry can direct current to the slider deformer any time prior to reading data.

Figure 4:
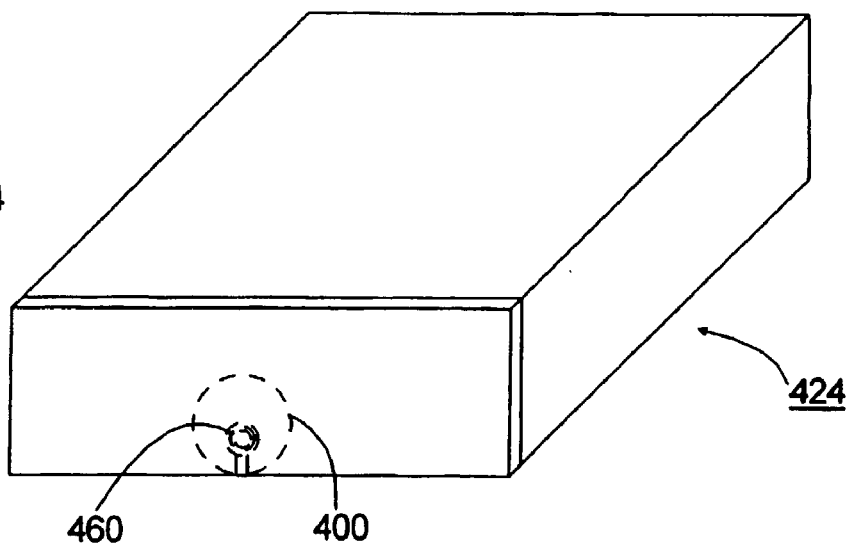
FIG. 4 is a perspective view of another embodiment of a slider assembly having features of the present invention.

FIG. 4 illustrates a perspective view of another embodiment of a slider assembly 424 that is somewhat similar to the slider assembly 324 illustrated in FIG. 3A. However, in this embodiment, the slider deformer 400 is substantially flat disk shaped. Stated another way, in this embodiment, the slider deformer 400 mimics the general shape of an enlarged write element 460. In this embodiment, the diameter of the slider deformer 400 can vary, although the slider deformer 400 can have a diameter that is approximately one to five times the outside diameter of the write element 460. In alternate embodiments, for example, the slider deformer 400 can be elliptical, semi-circular, triangular, trapezoidal or another suitable configuration.

In this embodiment, the drive circuitry 18 (illustrated in FIG. 1) directs current to the slider deformer 400 in a fashion somewhat similar to the embodiment described above and illustrated in FIG. 3A to dynamically adjust the head-to-disk spacing.

Figure 5:
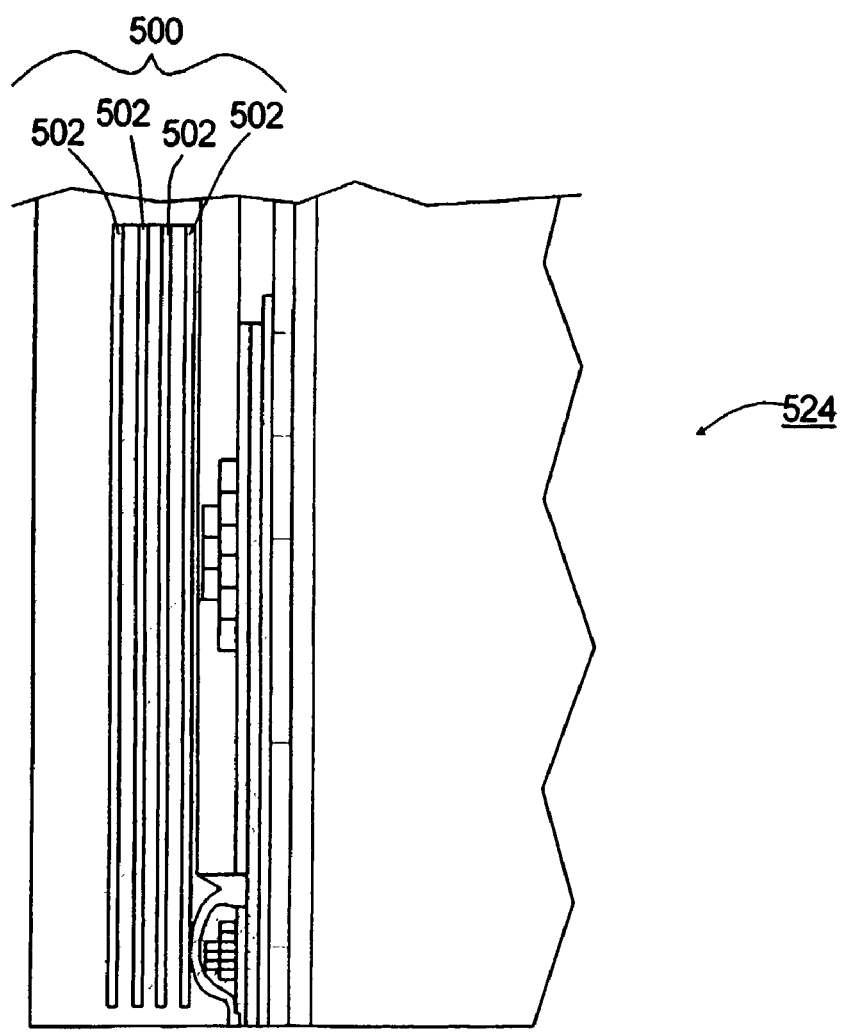
FIG. 5 is a partial cross-sectional view of another embodiment of the slider assembly.

FIG. 5 is a cross-sectional view of yet another embodiment of a slider assembly 524 that is somewhat similar to the slider assembly 324 illustrated in FIG. 3A. However, in this embodiment, the slider deformer 500 includes a plurality of spaced apart deformer layers 502. The number of deformer layers 502 can vary. In FIG. 5, the slider deformer 500 includes four, generally planar shaped, deformer layers 502.

The positioning, composition and size of the deformer layers 502 can vary. In FIG. 5, the deformer layers 502 are substantially parallel to each other, although this configuration is not required. Further, the deformer layers 502 can each be the same or each of the deformer layers 502 can be made of differing thicknesses and of differing materials. For example, the deformer layers 502 can alternate between a thicker layer (i.e. 100 nanometers) and a thinner layer (i.e. 10 nanometers). Although the material used can vary, at least one of the materials used in the slider deformer 502 has a thermal conductivity and resistivity consistent with the ranges provided previously. With this design, the slider deformer 500 can provide relatively quick heating of the slider assembly 524 in order to provide rapid head-to-disk spacing adjustment.

In this embodiment, the drive circuitry 18 (illustrated in FIG. 1) directs current to the deformer layers 502 of the slider deformer 500 in a fashion somewhat similar to the embodiment described above and illustrated in FIG. 3A to dynamically adjust the head-to-disk spacing.

Figure 6A:
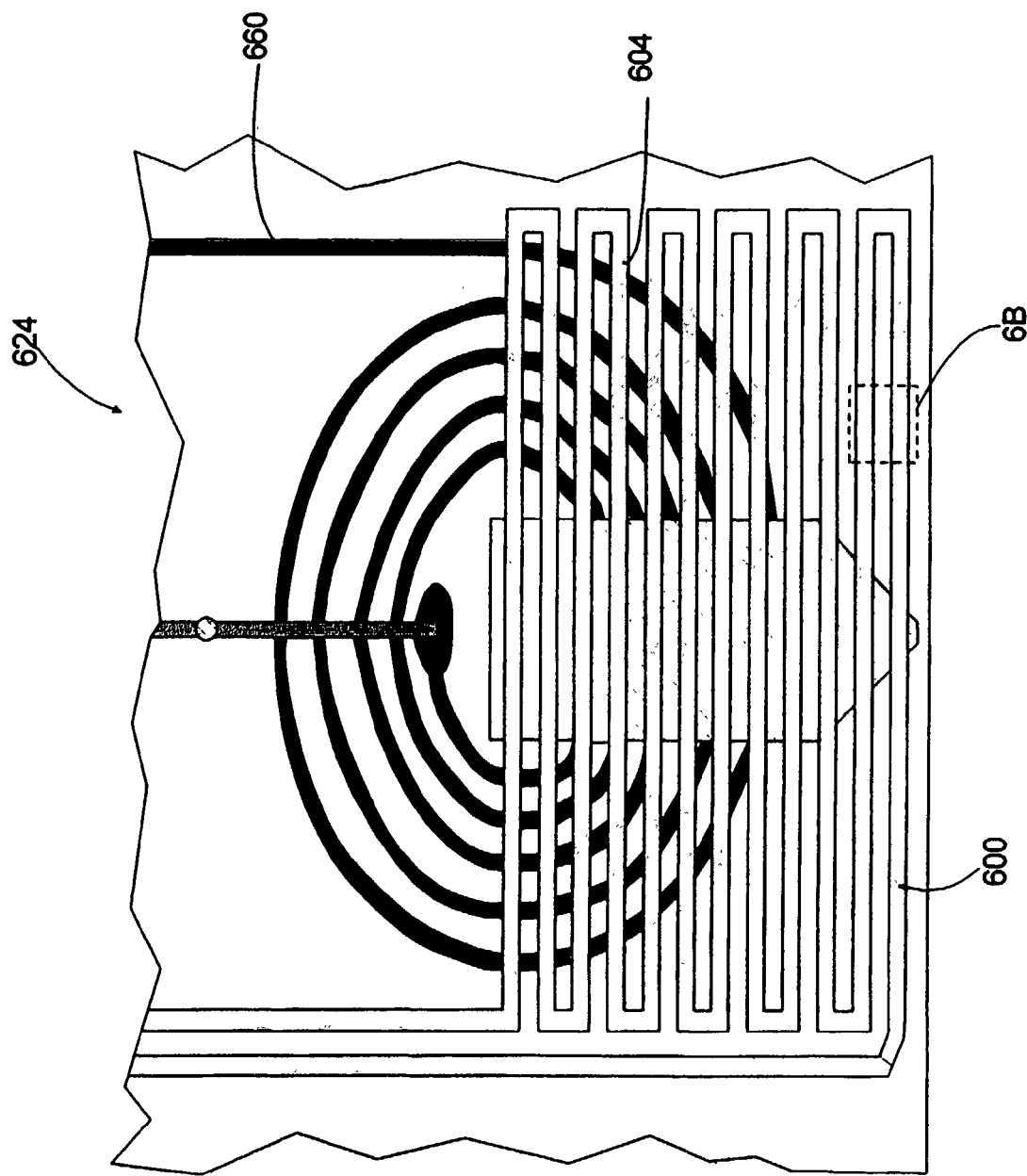
FIG. 6A is an illustration of a portion of still another embodiment of a slider assembly having features of the present invention.

FIG. 6A illustrates another embodiment of a slider assembly 624 that is somewhat similar to the slider assembly 324 described above. However, in this embodiment, the slider deformer 600 is a continuous heating element having an even number of substantially parallel deformer legs 604 that wind back and forth near the write element 660. The slider deformer 600 can wind back and forth in any direction. As illustrated in FIG. 6A, the slider deformer 600 winds back and forth in the horizontal direction in a serpentine shaped pattern. Alternately, the slider deformer 600 can be coil shaped, or the slider deformer 600 can wind back and forth in the vertical direction.

With these designs, the slider deformer 600 is configured to provide an increased amount of exposed surface area to efficiently transfer heat from the slider deformer 600 to the slider assembly 624. Additionally, with these designs, the increased amount of exposed surface area of the slider deformer 600 promotes a secure bonding between the slider deformer 600 and other adjacent layers of the slider assembly 624.

In this embodiment, the drive circuitry 18 (illustrated in FIG. 1) directs current to the slider deformer 600 in a fashion somewhat similar to the embodiment described above and illustrated in FIG. 3A to dynamically adjust the head-to-disk spacing. Further, the drive circuitry 18 in this embodiment, directs current to the slider deformer 600 independently from the write element 660.

Figure 6B:
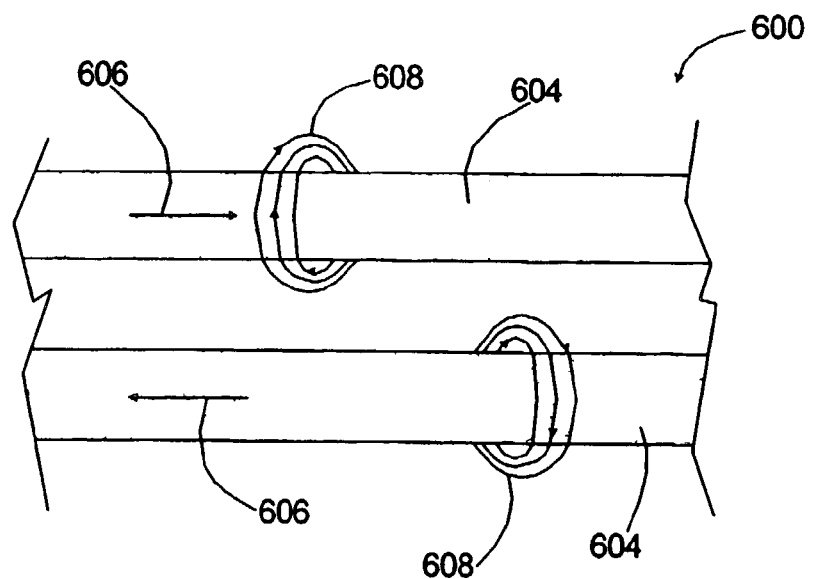
FIG. 6B is an enlarged detail view including magnetic flux lines taken from dashed rectangle 6B in FIG. 6A.

FIG. 6B is an enlarged detail view of a portion of the slider deformer 600 in FIG. 6A. In this embodiment, the flow of current (indicated by arrows 606) through the deformer legs 604 can cause a magnetic flux (indicated by flux lines 608) around each of the deformer legs 604. Because of the configuration of the slider deformer 600 including an even number of deformer legs 604, the magnetic flux that is generated around one of the deformer legs 604 is substantially canceled by the magnetic flux that is generated around an adjacent deformer leg 604. Over the length of the slider deformer 600, the magnetic flux generated around of each deformer leg 604 is essentially canceled by the magnetic flux generated around an adjacent deformer leg 604. In other words, the slider deformer 600 effectively does not generate any substantial net magnetic field that could otherwise adversely impact a magnetic field generated by the write element 660 (illustrated in FIG. 6A) during writing of data.

Figure 7:
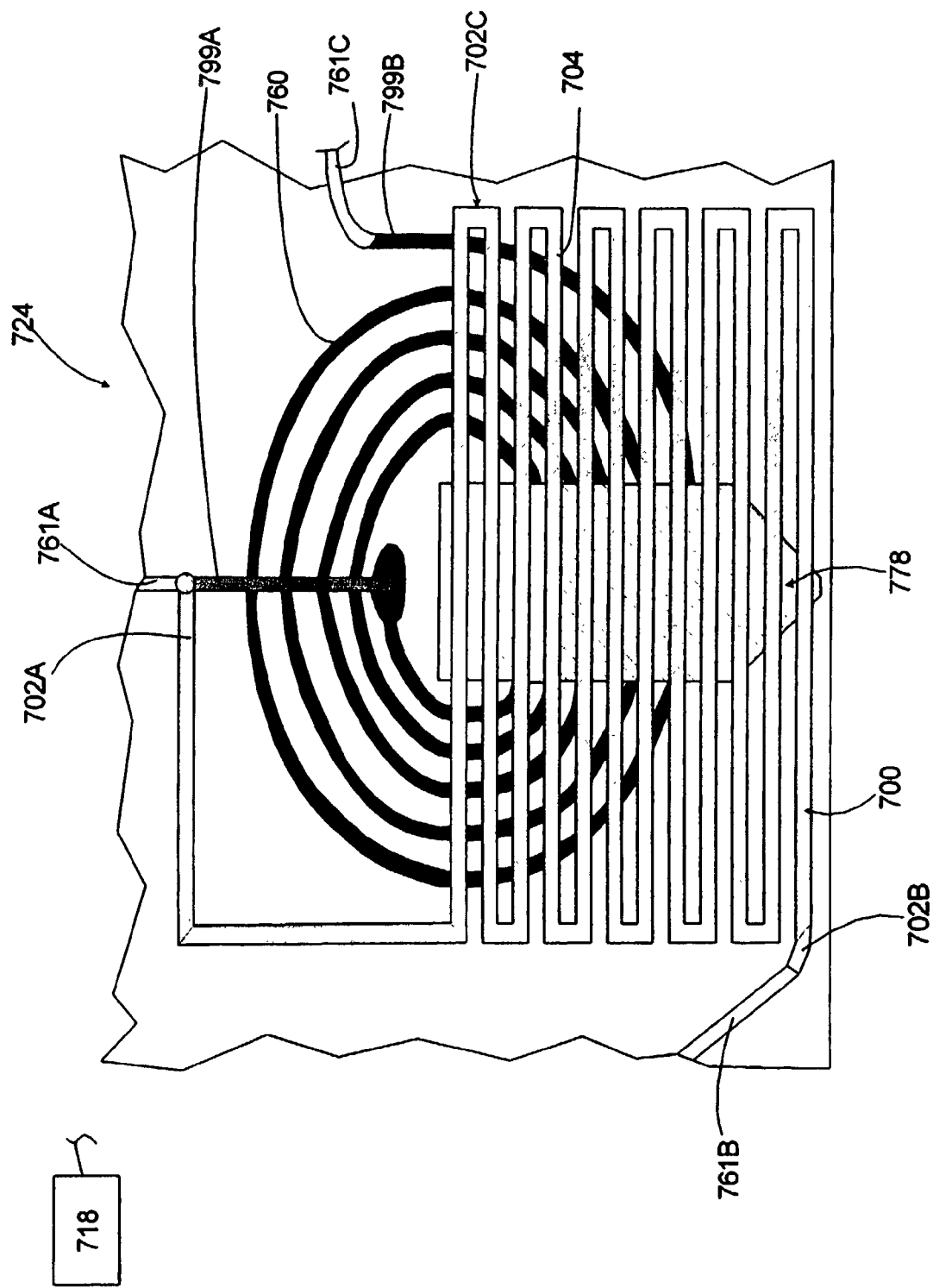
FIG. 7 is an illustration of a portion of another embodiment of a slider assembly having features of the present invention.

FIG. 7 is a cut-away view of another embodiment of a slider assembly 724 that is somewhat similar to the slider assembly 624 described above. In this embodiment the write head 778 includes a write element 760 that is can be structurally similar to a prior art type write element. Further, in this embodiment, the slider deformer 700 includes a first end 702A, a second end 702B and an intermediate region 702C. The intermediate region 702C includes an even number of substantially parallel deformer legs 704 that wind back and forth. The deformer legs 704 can wind back and forth in any direction. In the embodiment illustrated in FIG. 7A, the deformer legs 704 wind back and forth in a serpentine pattern generally in a horizontal direction. The slider deformer 700 is positioned near the write head 778.

In FIG. 7, the slider assembly 724 includes (i) a first conductor 761A that is connected to the first end 702A of the slider deformer 700 and a first end 799A of the write element 760, (ii) a second conductor 761B that is connected to the second end 702B of the slider deformer 700, and (iii) a third conductor 761C that is connected to a second end 799B of the write element 760. The conductors 761A–761C are also electrically connected to the drive circuitry 718. Electrical current can be directed by the drive circuitry 718 through the first conductor 761A to the first end 702A of the slider deformer 700 and the first end 799A of the write element 760.

In the embodiment illustrated in FIG. 7, the slider deformer 700 and the write element 760 are electrically connected. Further, electrical current from the drive circuitry 718 can be directed to either the slider deformer 700 and/or the write element 760 by controlling the polarity of conductors 761A, 761B, 761C. For example, to direct current through the slider deformer 700 only, the polarity of the first conductor 7621A and the third conductor 761C are the same while the polarity of the second conductor 761B is different. Alternately, to direct current through the write element 760 only, the polarity of the first conductor 761A and the second conductor 761B are the same while the polarity of the third conductor 761C is different. Still alternately, to direct current simultaneously through both the slider deformer 700 and the write element 760, the polarity of the second and third conductors 799B, 799C is different from the polarity of the first conductor 799A. However, in an alternate embodiment (not shown) the slider deformer 700 and the write element 760 can be electrically decoupled.

In this embodiment, the drive circuitry 718 directs current to the slider deformer 700 in a fashion somewhat similar to the embodiment described above and illustrated in FIG. 3A to dynamically adjust the head-to-disk spacing.

It should be noted that in this embodiment, the magnetic flux in the deformer legs 704 essentially cancels each other. With this design, the slider deformer 700 effectively does not generate a net magnetic field.

Figure 8:
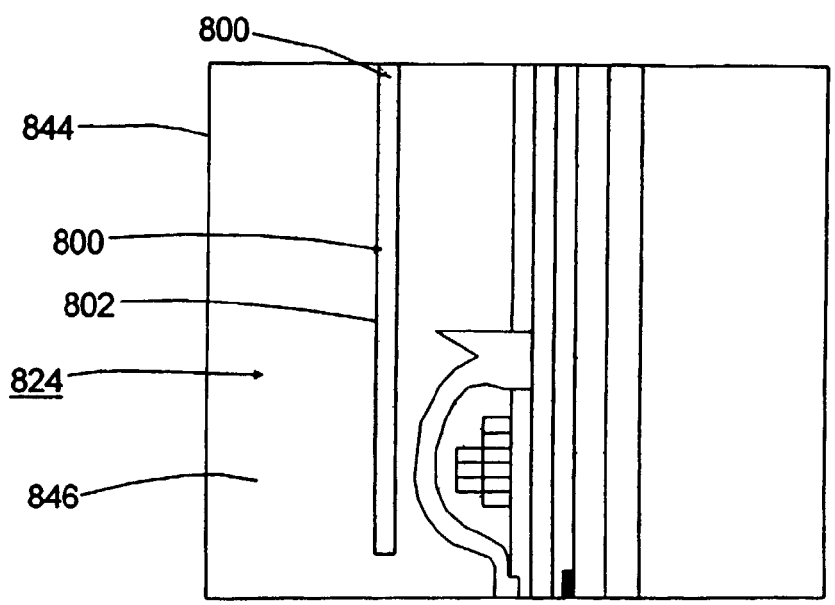
FIG. 8 is a partial cross-sectional view of another embodiment of the slider assembly.

FIG. 8 illustrates another embodiment of the slider assembly 824 that includes a slider deformer 800. In this embodiment, the slider deformer 800 includes one or more piezoelectric elements 802. The piezoelectric elements 802 can be positioned on the exterior surface 844 of the slider assembly 824, or within the slider interior 846. In this embodiment, the drive circuitry 18 (illustrated in FIG. 1) directs current to the piezoelectric element 802 to selectively deform a portion of the slider assembly 824, or the entire slider assembly 824.

The timing and amount of current directed to the piezoelectric elements 802 can be varied to suit the head-to-disk spacing requirements of the disk drive.

While the particular slider assembly 24 and disk drive 10, as herein shown and disclosed in detail, is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A disk drive comprising:
   a storage disk;
   a slider assembly that magnetically interacts with the storage disk to write data to the storage disk, the slider assembly including an inductive write element, the inductive write element having a first end, a second end and an intermediate section positioned between the first end and the second end;
   a conductor that is connected to the intermediate section; and
   a controller that directs a first electrical current through the conductor to heat the inductive write element without writing data to the storage disk.

2. The disk drive of claim 1 wherein the intermediate section includes a midpoint and wherein the conductor is connected to the intermediate section approximately at the midpoint.

3. The disk drive of claim 1 wherein the first electrical current is directed through the conductor during a seek operation.

4. The disk drive of claim 1 wherein the first electrical current is directed through the conductor immediately preceding writing data to the storage disk.

5. The disk drive of claim 1 wherein the first electrical current is directed through the conductor during a read operation.

6. The disk drive of claim 5 wherein the first electrical current remains substantially constant during the read operation.

7. The disk drive of claim 1 wherein the first electrical current is directed through the conductor immediately preceding reading data from the storage disk.

8. The disk drive of claim 1 wherein the slider assembly includes a sensor that senses the temperature of a portion of the slider assembly.

9. The disk drive of claim 8 wherein the slider assembly includes a read head, and wherein the sensor is electrically decoupled from the read head.

10. The disk drive of claim 1 wherein heating the inductive write element causes a deformation of the slider assembly in a direction generally toward the storage disk.

11. The disk drive of claim 1 wherein the first electrical current does not generate a magnetic field sufficient to write data to the storage disk.

12. The disk drive of claim 11 wherein the controller directs a second electrical current to the slider assembly, the second electrical current generating a magnetic field sufficient to write data to the storage disk.

13. The disk drive of claim 1 wherein the controller directs the first electrical current to the inductive write element to adjust a head-to-disk spacing.

14. The disk drive of claim 13 wherein the controller directs a second electrical current to the inductive write element that writes data to the storage disk.

15. The disk drive of claim 13 wherein the first electrical current adjusts the head-to-disk spacing by at least approximately 20 percent.

16. The disk drive of claim 13 wherein the controller directs the first electrical current to the write element to maintain the head-to-disk spacing at greater than zero nanometers.

17. A disk drive comprising:
   a storage disk;
   a slider assembly that writes data to the storage disk, the slider assembly including a write element;
   a first conductor that is connected to the write element;
   a second conductor that is connected to the write element; and
   a controller that directs a first current through the first conductor to the write element to heat the slider assembly without writing data to the storage disk and a second current through the second conductor to the write element to write data to the storage disk.

18. The disk drive of claim 17 wherein the first current is used during a seek operation.

19. The disk drive of claim 17 wherein the first current is used immediately preceding writing data to the storage disk.

20. The disk drive of claim 17 wherein the first current is used immediately preceding reading data from the storage disk.

21. The disk drive of claim 17 wherein the first current is used during reading of data from the storage disk.

22. The disk drive of claim 21 wherein the first current remains substantially constant during the reading of data from the storage disk.

23. The disk drive of claim 17 wherein the write element includes a first end, a second end and an intermediate section positioned between the first end and the second end, the first conductor connected to the intermediate section, and the second conductor being connected to one of the ends.

24. The disk drive of claim 17 wherein heating the slider assembly with the first current adjusts a head-to-disk spacing.

25. A disk drive comprising:
   a storage disk;
   a slider assembly that magnetically interacts with the storage disk, the slider assembly including a write element and a substantially serpentine shaped slider deformer having a plurality of bends; and
   a controller that directs electrical current to the slider deformer to cause a deformation of the slider assembly.

26. The disk drive of claim 25 wherein the slider deformer includes a plurality of substantially parallel deformer legs.

27. The disk drive of claim 26 wherein the slider deformer includes an even number of deformer legs.

28. The disk drive of claim 26 wherein each deformer leg generates a magnetic field when electrical current is directed to the slider deformer, the magnetic field of each deformer leg being substantially canceled by the magnetic field of an adjacent deformer leg to yield a net magnetic field of the slider deformer that is approximately zero.

29. The disk drive of claim 25 wherein the electrical current that is directed to the slider deformer is direct current.

30. The disk drive of claim 25 wherein the electrical current that is directed to the slider deformer is alternating current.

31. A disk drive comprising:
a storage disk;
a slider assembly that magnetically interacts with the storage disk to write data to the storage disk, the slider assembly including a write element, the write element having a first end, a second end and an intermediate section positioned between the first end and the second end, the intermediate section including a midpoint;
a conductor that is connected to the intermediate section approximately at the midpoint; and
a controller that directs a first electrical current through the conductor to heat the write element without writing data to the storage disk.

32. A disk drive comprising:
a storage disk;
a slider assembly that magnetically interacts with the storage disk to write data to the storage disk, the slider assembly including a write element, the write element having a first end, a second end and an intermediate section positioned between the first end and the second end;
a conductor that is connected to the intermediate section; and
a controller that directs a first electrical current through the conductor during a read operation to heat the write element without writing data to the storage disk.

33. The disk drive of claim 32 wherein the first electrical current remains substantially constant during the read operation.

34. A disk drive comprising:
a storage disk;
a slider assembly that magnetically interacts with the storage disk to write data to the storage disk, the slider assembly including a write element, the write element having a first end, a second end and an intermediate section positioned between the first end and the second end;
a conductor that is connected to the intermediate section; and
a controller that directs a first electrical current through the conductor to heat the write element to adjust a head-to-disk spacing without writing data to the storage disk.

35. The disk drive of claim 34 wherein the controller directs a second electrical current to the write element to write data to the storage disk.

36. The disk drive of claim 34 wherein the first electrical current adjusts the head-to-disk spacing by at least approximately 20 percent.

37. A disk drive comprising:
a storage disk;
a slider assembly that writes data to the storage disk, the slider assembly including a write element; and
a controller that directs a first current to the write element during reading of data from the storage disk to heat the slider assembly without writing data to the storage disk and a second current to the write element to write data to the storage disk.

38. The disk drive of claim 37 wherein the first current remains substantially constant during the reading of data from the storage disk.

39. A disk drive comprising:
a storage disk;
a slider assembly that writes data to the storage disk, the slider assembly including a write element having a first end, a second end and an intermediate section positioned between the first end and the second end;
a first conductor that is connected to the first end;
a second conductor that is connected to the second end;
a third conductor that is connected to the intermediate section; and
a controller that is electrically coupled to each of the conductors, the controller directing a first current to the write element to heat the slider assembly without writing data to the storage disk and a second current to the write element to write data to the storage disk.

40. The disk drive of claim 39 wherein the first current is directed through the third conductor.

41. The disk drive of claim 40 wherein the first current is directed through the first and second conductors.

42. The disk drive of claim 39 wherein the second current is not directed through the third conductor.

43. A disk drive comprising:
a storage disk; and
a slider assembly that writes data to the storage disk during a write operation, the slider assembly including a write head and a slider deformer; and
a controller that directs current to the slider deformer during the write operation to dynamically adjust the head-to-disk spacing, the controller directing a substantially constant current to the slider deformer during reading data from the storage disk and a dynamically adjusted current to the slider deformer during writing of data to the storage disk.

44. A disk drive comprising:
a storage disk; and
a slider assembly that writes data to the storage disk during a write operation, the slider assembly including a write head and a slider deformer, the slider assembly having a slider exterior surface, wherein no portion of the slider deformer forms a portion of the slider exterior surface; and
a controller that directs current to the slider deformer during the write operation to dynamically adjust the head-to-disk spacing.

45. A disk drive comprising:
a storage disk;
a suspension;
a slider assembly that is supported by the suspension, the slider assembly writing data to the storage disk during a write operation, the slider assembly including a write head and a slider deformer; and
a controller that directs a substantially constant current to the slider deformer while reading data from the storage disk, and a dynamically adjusted current to the slider deformer while writing data to the storage disk during the write operation to dynamically maintain a head-to-disk spacing of greater than zero nanometers.

46. The disk drive of claim 45 wherein the controller directs current to the slider deformer during writing of data to the storage disk.

47. A disk drive comprising:
a storage disk;
a suspension;
a slider assembly that is supported by the suspension, the slider assembly writing data to the storage disk during a write operation, the slider assembly including a write head and a slider deformer; and
a controller that directs current to the slider deformer during the write operation to dynamically maintain a head-to-disk spacing of greater than zero nanometers, the controller simultaneously directing current to (i) the write head to conduct the write operation, and (ii) the slider deformer.

48. The disk drive of claim 47 wherein the controller directs current to the slider deformer during a seek mode of the write operation.

49. The disk drive of claim 47 wherein the slider deformer includes a piezoelectric element.

50. The disk drive of claim 47 wherein the slider deformer is substantially serpentine-shaped.

51. The disk drive of claim 50 wherein the slider deformer includes a plurality of substantially parallel deformer legs.

52. A disk drive comprising:
a storage disk;
a suspension;
a slider assembly that is supported by the suspension, the slider assembly writing data to the storage disk during a write operation, the slider assembly including a write head and a slider deformer; and
a controller that directs a substantially constant current to the slider deformer while reading data from the storage disk, and a dynamically adjusted current to the slider deformer while writing data to the storage disk during the write operation to adjust a head-to-disk spacing to inhibit contact between the slider assembly and the storage disk.

53. The disk drive of claim 52 wherein the controller directs current to the slider deformer during writing of data to the storage disk.

54. A disk drive comprising:
a storage disk;
a suspension;
a slider assembly that is supported by the suspension, the slider assembly writing data to the storage disk during a write operation, the slider assembly including a write head and a slider deformer; and
a controller that directs current to the slider deformer during the write operation to adjust a head-to-disk spacing to inhibit contact between the slider assembly and the storage disk, the controller simultaneously directing current to (i) the write head to conduct the write operation, and (ii) the slider deformer.

55. The disk drive of claim 54 wherein the controller directs current to the slider deformer during a seek mode of the write operation.

56. The disk drive of claim 54 wherein the slider deformer is substantially serpentine-shaped.

57. A disk drive comprising:
a storage disk;
a suspension;
a slider assembly that is supported by the suspension, the slider assembly writing data to the storage disk during a write operation, the slider assembly including a write head and a slider deformer that has an electrical resistivity of less than approximately 5 micro ohms-centimeter; and
a controller that directs current (i) to the write head to conduct the write operation, and (ii) to the slider deformer to dynamically adjust a head-to-disk spacing during the write operation.

58. A disk drive comprising:
a storage disk;
a suspension;
a slider assembly that is supported by the suspension, the slider assembly writing data to the storage disk during a write operation, the slider assembly including a write head and a slider deformer that has an electrical resistivity of less than approximately 2 micro ohms-centimeter; and
a controller that directs current (i) to the write head to conduct the write operation, and (ii) to the slider deformer to dynamically adjust a head-to-disk spacing during the write operation.

59. A disk drive comprising:
a storage disk;
a suspension;
a slider assembly that is supported by the suspension, the slider assembly writing data to the storage disk during a write operation, the slider assembly including a write head and a slider deformer that is formed from a material that includes a copper alloy; and
a controller that directs current (i) to the write head to conduct the write operation, and (ii) to the slider deformer to dynamically adjust a head-to-disk spacing during the write operation.

60. The disk drive of claim 59 wherein the slider deformer includes a plurality of substantially parallel deformer legs.

61. A disk drive comprising:
a storage disk;
a suspension;
a slider assembly that is supported by the suspension, the slider assembly writing data to the storage disk during a write operation, the slider assembly including a write head and a slider deformer; and
a controller that directs (i) current to the write head to conduct the write operation, (ii) a substantially constant current to the slider deformer during reading of data from the storage disk, and (iii) a dynamically adjusted current to the slider deformer to adjust a head-to-disk spacing during the write operation.

62. The disk drive of claim 61 wherein the slider deformer includes a piezoelectric element.

63. The disk drive of claim 61 wherein the slider assembly includes a sensor that senses the temperature of a portion of the slider assembly.

64. A disk drive comprising:
a storage disk;
a suspension;
a slider assembly that is supported by the suspension, the slider assembly writing data to the storage disk during a write operation, the slider assembly including a write head and a slider deformer, the slider assembly having a slider exterior surface, wherein no portion of the slider deformer forms a portion of the slider exterior surface; and
a controller that directs current (i) to the write head to conduct the write operation, and (ii) to the slider deformer to dynamically adjust a head-to-disk spacing during the write operation.

65. The disk drive of claim 64 wherein the controller directs current to the slider deformer during a seek mode of the write operation.

66. The disk drive of claim 64 wherein the controller directs current to the slider deformer during writing of data to the storage disk.

67. The disk drive of claim 64 wherein the slider deformer is substantially serpentine-shaped.

68. The disk drive of claim 67 wherein the slider deformer includes a plurality of substantially parallel deformer legs.

69. A disk drive comprising:
a storage disk; and
a slider assembly that writes data to the storage disk during a write operation, the slider assembly including a write head and a substantially serpentine-shaped slider deformer having a plurality of substantially parallel deformer legs; and
a controller that directs current to the slider deformer during the write operation to dynamically adjust the head-to-disk spacing.

70. A disk drive comprising:
a storage disk;
a suspension;
a slider assembly that is supported by the suspension, the slider assembly writing data to the storage disk during at least part of a write operation, the slider assembly including a write head and a slider deformer, the slider deformer having an electrical resistivity of less than approximately 5 micro ohms-centimeter; and
a controller that directs current to the slider deformer during the write operation to dynamically adjust the head-to-disk spacing.

71. A disk drive comprising:
a storage disk;
a suspension;
a slider assembly that is supported by the suspension, the slider assembly writing data to the storage disk during at least part of a write operation, the slider assembly including a write head and a slider deformer, the slider deformer having an electrical resistivity of less than approximately 2 micro ohms-centimeter; and
a controller that directs current to the slider deformer during the write operation to dynamically adjust the head-to-disk spacing.

72. A disk drive comprising:
a storage disk;
a suspension;
a slider assembly that is supported by the suspension, the slider assembly writing data to the storage disk during at least part of a write operation, the slider assembly including a write head and a slider deformer, the slider deformer being formed from a material that includes a copper alloy; and
a controller that directs current to the slider deformer during the write operation to dynamically adjust the head-to-disk spacing.

73. A disk drive comprising:
a storage disk;
a suspension;
a slider assembly that is supported by the suspension, the slider assembly writing data to the storage disk during at least part of a write operation, the slider assembly including a write head and a slider deformer, the slider deformer being substantially serpentine-shaped; and
a controller that directs current to the slider deformer during the write operation to dynamically adjust the head-to-disk spacing.

74. The disk drive of claim 73 wherein the slider deformer includes a plurality of substantially parallel deformer legs.

75. A disk drive comprising:
a storage disk;
a suspension;
a slider assembly that is supported by the suspension, the slider assembly writing data to the storage disk during at least part of a write operation, the slider assembly including a write head and a slider deformer; and
a controller that directs a substantially constant current to the slider deformer during reading data from the storage disk, and directs a dynamically adjusted current to the slider deformer during writing of data to the storage disk to dynamically adjust the head-to-disk spacing.

76. A disk drive comprising:
a storage disk;
a suspension;
a slider assembly that is supported by the suspension, the slider assembly writing data to the storage disk during at least part of a write operation, the slider assembly including a slider exterior surface, a write head and a slider deformer that does not form any portion of the slider exterior surface; and
a controller that directs current to the slider deformer during the write operation to dynamically adjust the head-to-disk spacing.

77. A disk drive comprising:
a storage disk;
a suspension;
a slider assembly that is supported by the suspension, the slider assembly writing data to the storage disk during at least part of a write operation, the slider assembly including a write head and a slider deformer; and
a controller that simultaneously directs current to the write head and the slider deformer, the controller directing current to the slider deformer during the write operation to dynamically adjust the head-to-disk spacing, the controller.

78. A disk drive comprising:
a storage disk;
a slider assembly that magnetically interacts with the storage disk, the slider assembly including a write element and a substantially serpentine-shaped slider deformer having a plurality of bends and a plurality of substantially parallel deformer legs; and
a controller that directs electrical current to the slider deformer to cause a deformation of the slider assembly.

79. The disk drive of claim 78 wherein the slider deformer includes an even number of deformer legs.

80. The disk drive of claim 78 wherein each deformer leg generates a magnetic field when electrical current is directed to the slider deformer, the magnetic field of each deformer leg being substantially canceled by the magnetic field of an adjacent deformer leg to yield a net magnetic field of the slider deformer that is approximately zero.

81. A disk drive comprising:
a storage disk;
a slider assembly that magnetically interacts with the storage disk, the slider assembly including a write element and a slider deformer having a plurality of bends; and
a controller that directs a substantially constant current to the slider deformer during reading data from the storage disk, and directs a dynamically adjusted current to the slider deformer during writing of data to the storage disk to cause a deformation of the slider assembly.

82. A disk drive comprising:
   a storage disk;
   a slider assembly that magnetically interacts with the storage disk, the slider assembly including a write element and a slider deformer having a plurality of bends; and
   a controller that simultaneously directs current to (i) the write head to conduct the write operation, and (ii) the slider deformer to cause a deformation of the slider assembly.

* * * * *

UNITED STATES PATENT AND TRADEMARK OFFICE
CERTIFICATE OF CORRECTION

PATENT NO. : 7,092,193 B1 Page 1 of 1
APPLICATION NO. : 10/211671
DATED : August 15, 2006
INVENTOR(S) : McKenzie et al.

It is certified that error appears in the above-identified patent and that said Letters Patent is hereby corrected as shown below:

On the cover sheet (56) under the heading "References Cited", please add
-- 6,768, 610 B1* 7/2004 Morris et al. --.

Signed and Sealed this

Twenty-first Day of November, 2006

JON W. DUDAS
*Director of the United States Patent and Trademark Office*